United States Patent
Koyama

(10) Patent No.: US 11,079,095 B2
(45) Date of Patent: Aug. 3, 2021

(54) LIGHTING APPARATUS

(71) Applicant: TOPPAN PRINTING CO., LTD., Tokyo (JP)

(72) Inventor: Masaki Koyama, Hino (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 0 days.

(21) Appl. No.: 16/987,791

(22) Filed: Aug. 7, 2020

(65) Prior Publication Data
US 2020/0363038 A1 Nov. 19, 2020

Related U.S. Application Data

(63) Continuation of application No. PCT/JP2018/042716, filed on Nov. 19, 2018.

(30) Foreign Application Priority Data

Feb. 16, 2018 (JP) .............................. JP2018-025750

(51) Int. Cl.
*F21V 9/38* (2018.01)
*F21V 7/00* (2006.01)
(Continued)

(52) U.S. Cl.
CPC .............. *F21V 9/38* (2018.02); *F21V 7/0008* (2013.01); *G02F 1/292* (2013.01); *F21Y 2115/30* (2016.08)

(58) Field of Classification Search
CPC ........ F21V 9/38; F21V 7/0008; F21V 7/0033; F21V 7/26; F21V 14/003; G02F 1/292; G02F 1/13; F21Y 2115/30
See application file for complete search history.

(56) References Cited

U.S. PATENT DOCUMENTS

2008/0291390 A1* 11/2008 Iwane ................... G02F 1/1334
349/201
2014/0063779 A1* 3/2014 Bradford ............. F21V 23/0442
362/84
(Continued)

FOREIGN PATENT DOCUMENTS

| JP | 5-204001 A | 8/1993 |
|---|---|---|
| JP | 2011-134619 A | 7/2011 |
| WO | 2014/203488 A1 | 12/2012 |

OTHER PUBLICATIONS

English Translation of Written Opinion of the International Searching Authority dated Dec. 18, 2018, in corresponding International Patent Application No. PCT/JP2018/042716 (4 pages). (Japanese language Written Opinion document submitted in IDS filed on Aug. 7, 2020 as item AK in Form PTO-1449).

(Continued)

*Primary Examiner* — Alan B Cariaso

(57) ABSTRACT

A lighting apparatus includes: a laser light source emitting laser light; a liquid crystal device that transmits the laser light from the laser light source and diffracts the laser light; a phosphor unit that receives laser light from the liquid crystal device, converts a wavelength of the laser light to emit illumination light, the phosphor unit including a first phosphor of a first color and a second phosphor of a second color differing from the first color. The liquid crystal device controls an angle of the laser light and selects one of the first phosphor or the second phosphor.

10 Claims, 16 Drawing Sheets

(51) Int. Cl.
*G02F 1/29* (2006.01)
*F21Y 115/30* (2016.01)

(56) References Cited

U.S. PATENT DOCUMENTS

| | | | | |
|---|---|---|---|---|
| 2015/0176777 A1* | 6/2015 | Hikmet | ................ | H01L 33/504 |
| | | | | 362/84 |
| 2015/0252984 A1* | 9/2015 | Van Bommel | ............ | F21V 9/32 |
| | | | | 362/84 |
| 2015/0335246 A1* | 11/2015 | Rains, Jr. | .............. | F21V 23/003 |
| | | | | 362/231 |
| 2016/0201880 A1* | 7/2016 | Park | ........................ | F21S 41/33 |
| | | | | 362/84 |

OTHER PUBLICATIONS

International Search Report dated Dec. 18, 2018, in corresponding International Patent Application No. PCT/JP2018/042716.
Written Opinion of the International Searching Authority dated Dec. 18, 2018, in corresponding International Patent Application No. PCT/JP2018/042716.

* cited by examiner

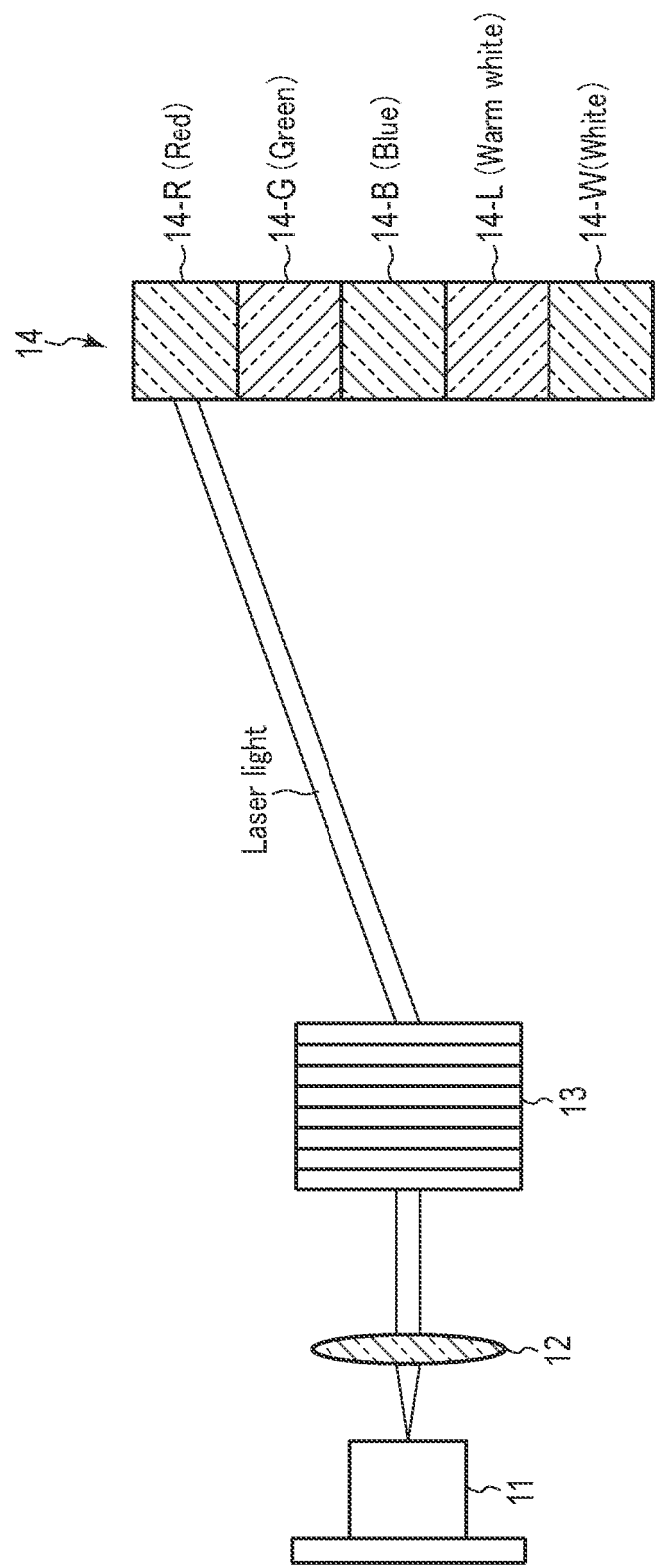
F I G. 2

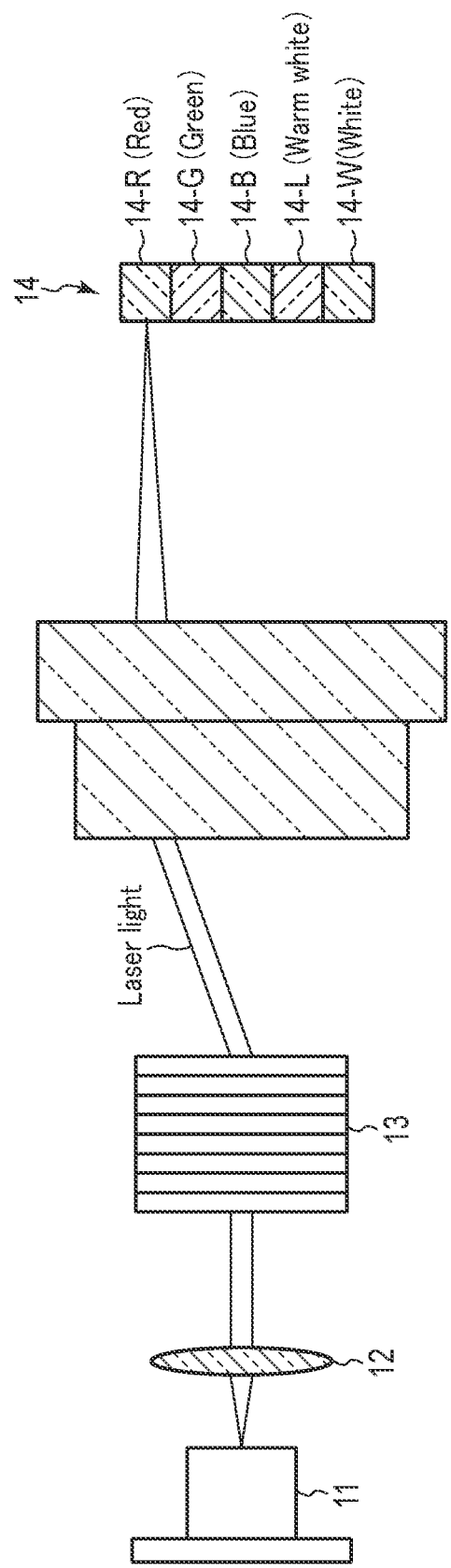
F I G. 15

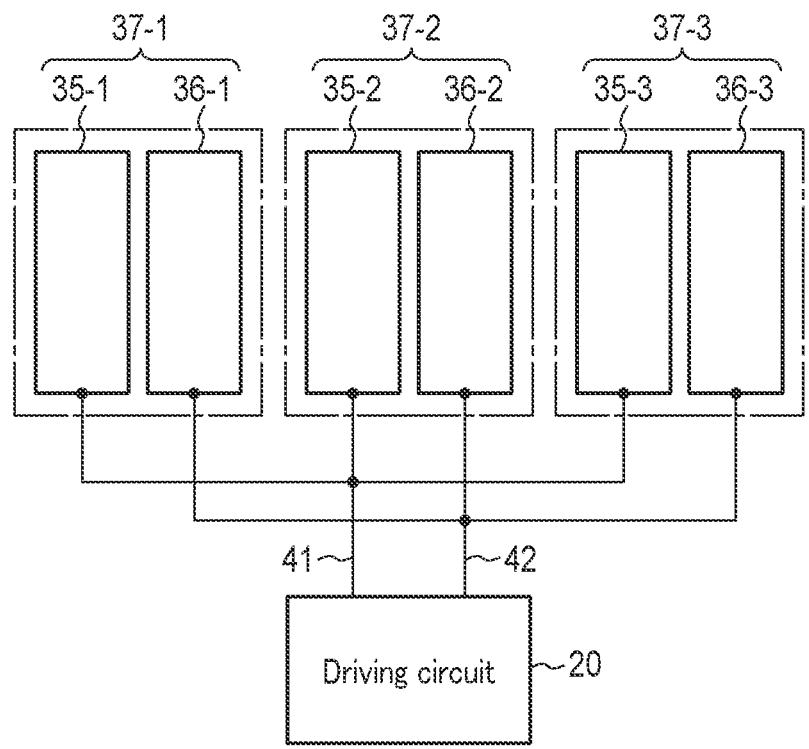
F I G. 22
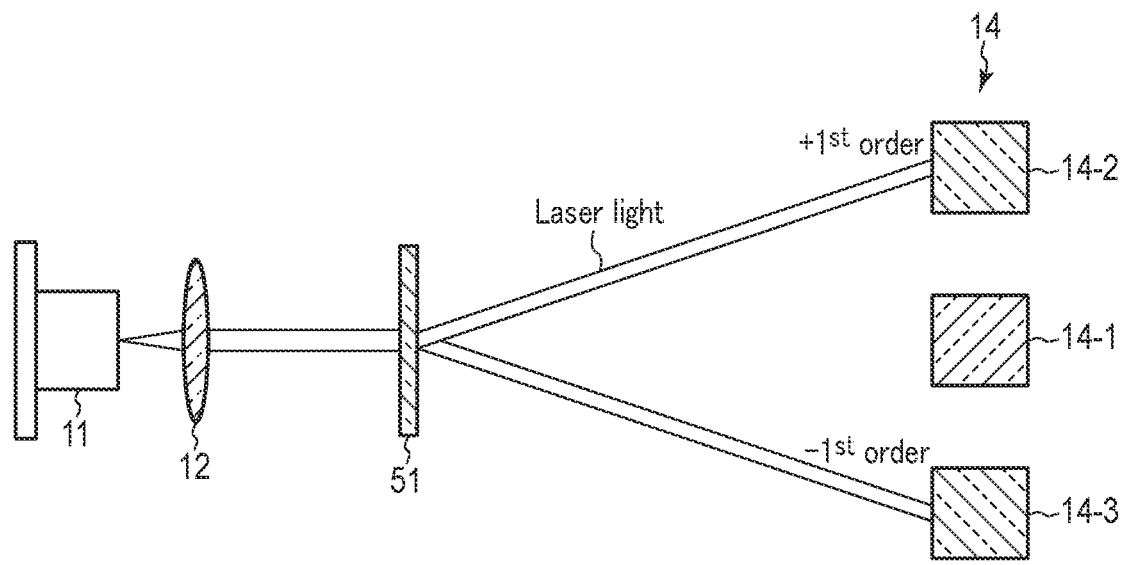
F I G. 23

LIGHTING APPARATUS

CROSS-REFERENCE TO RELATED APPLICATIONS

This application is a Continuation Application of PCT Application No. PCT/JP2018/042716, filed Nov. 19, 2018, and based upon and claiming the benefit of priority from Japanese Patent Application No. 2018-025750, filed Feb. 16, 2018, the entire contents of all of which are incorporated herein by reference.

FIELD

The present invention relates to a lighting apparatus, particularly a lighting apparatus using a liquid crystal device.

BACKGROUND

In recent years, psychological effects produced by brightness and colors of lighting have become widely known, and a lighting apparatus having a color controlling function or a brightness controlling function has been adopted for use in houses, offices, and shops. The color controlling function of such lighting apparatus achieves its color controlling effects through, in most cases, using a combination of light emitting elements of different colors.

A conventional light source of a lamp used for lighting, such as a filament bulb or a fluorescent lamp, has been replaced with an LED (light-emitting diode) or a laser diode demonstrating a better design and distribution of light, long life, and low power consumption.

Particularly, for interior lighting, a shift toward LEDs has accelerated due to improved performance of white-color LEDs and growing awareness of environmental problems in recent years. For car lamps, the adoption of LEDs has also been encouraged. Particularly for electric vehicles, which use electricity as their power source, more energy-efficient LEDs are widely adopted since the power consumption by the lamps directly affects cruising distance.

Since LEDs are subject to a droop phenomenon, in which efficiency of light emission decreases as a current density increases, it is necessary to arrange a plurality of LEDs in a two-dimensional or three-dimensional manner in order to obtain a larger amount of light. In contrast, a droop phenomenon is not observed in a laser light source, rendering it therefore possible to maintain high efficiency regardless of output level. Furthermore, it is possible to obtain a high-intensity point light source through concentrating laser light into a phosphor, thereby achieving a downsized lighting apparatus and a design that makes use of the lighting apparatus as a point light source.

Currently, since laser diodes (LDs) are more expensive than LEDs, it is desirable for a lower number of LDs to be in order to keep the cost as a lighting apparatus low. The price of the apparatus will be increased if attempts to obtain the color controlling effects involve many LDs combined.

SUMMARY

According to an aspect of the present invention, there is provided a light control device comprising:
a laser light source emitting laser light;
a liquid crystal device that transmits the laser light from the laser light source and diffracts the laser light;
a phosphor unit that receives laser light from the liquid crystal device, converts a wavelength of the laser light to emit illumination light, the phosphor unit including a first phosphor of a first color and a second phosphor of a second color differing from the first color,
wherein the liquid crystal device controls an angle of the laser light and selects one of the first phosphor or the second phosphor.

In the lighting apparatus according to the aspect of the present invention, the liquid crystal device deflects the laser light by forming a gradient of refractivity.

In the lighting apparatus according to the aspect of the present invention, the liquid crystal device is a diffraction grating that emits 0th-order diffracted light and ±first order diffracted light. The liquid crystal device includes a first area where a first electrode is provided and a second area where a second electrode is provided, and changes an intensity ratio of the 0th-order diffracted light and the ±first order diffracted light by changing a phase difference between the first area and the second area.

BRIEF DESCRIPTION OF THE DRAWINGS

FIG. 2 is a cross-sectional view mainly illustrating a phosphor unit shown in FIG. 1.

FIG. 15 is a cross-sectional view mainly illustrating a telecentric optical system shown in FIG. 14.

FIG. 22 is a schematic diagram of an interconnection structure of a diffraction grating.

FIG. 23 is a cross-sectional view illustrating a diffraction operation of a diffraction grating using ±first-order diffracted light.

DETAILED DESCRIPTION

Figure 1:
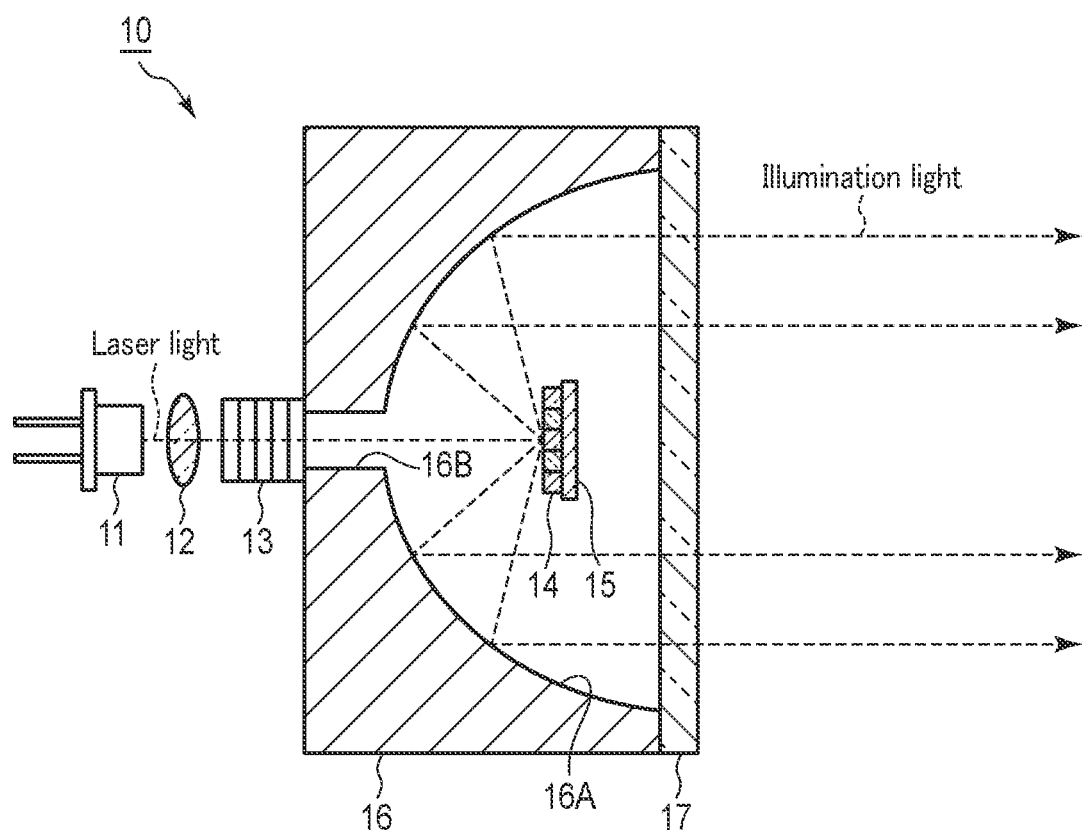
FIG. 1 is a cross-sectional view of a lighting apparatus according to a first embodiment.

The embodiments will be described with reference to the accompanying drawings. Note that the drawings are schematic or conceptual, and the dimensions and proportions of the drawings are not necessarily the same as the actual ones. Furthermore, even when parts shown in the drawings indicate the same part, they may be expressed with different dimensional relationships or ratios. Several embodiments described below merely show exemplary apparatuses and methods that implement the technical ideas of the present invention, and the technical ideas are not limited by the element shapes, structures, arrangements, etc. described below. In the description below, structural elements having substantially the same functions and configurations will be denoted by the same reference symbols, and a repetitive description of such elements will be given only where necessary.

First Embodiment

There is a tendency to choose a high color temperature for headlamps of an automobile for design reasons; however, visibility of a high color temperature is poor because it appears dark to human eyes. It is said that a pure white color at a color temperature of around 6,000 K is suitable for better visibility, whereas a lower color temperature is preferable for wet weather as it helps suppress irregular deflection of water droplets.

If a color of a light emitted from headlamps can be changed freely, it becomes possible to use such a light as a strong warning signal for vehicles running in front. If such headlamps are adopted for emergency vehicles, for example police cars, ambulances, or fire engines, it is possible to effectively notify vehicles running in front of a location of an emergency vehicle.

From the above points of view, it is expected to improve designs, safety, and warning effects through changing a color of a light emitted from a headlamp according to various situations. A light-emitting element, such as a halogen lamp or an LED, used for a conventional headlamp, does not have a color controlling function, and two or more light-emitting elements are required in order to provide more than one color tone. In the present embodiment, a lighting apparatus that can control colors of a single laser light source through a use of a laser light source, a liquid crystal light deflection device, and a plurality of phosphors, will be described.

[1] Configuration of Lighting Apparatus 10

[1-1] Cross-Sectional Configuration of Lighting Apparatus 10

FIG. 1 is a cross-sectional view of a lighting apparatus 10 according to the first embodiment. The lighting apparatus 10 includes a laser light source 11, a collimator 12, a light deflection device 13, a phosphor unit 14, a reflection member (plane mirror) 15, a reflection member (concave mirror) 16, and a transmissive filter 17. In FIG. 1, fixing members for fixing the laser light source 11, the collimator 12, the light deflection device 13, the phosphor unit 14, the reflection member 15, the reflection member 16, and the transmissive filter 17, are omitted; however, those modules are fixed by a plurality of fixing members (not shown) at the positions shown in FIG. 1.

The laser light source 11 emits single-wave length laser light. The laser light source 11 is comprised of a laser diode, for example. It is preferable to use a wavelength between a blue-violet color (around 360 nm) and a blue color (around 460 nm) in order to cause visible fluorescent light over a wide range. In the present embodiment, it is possible to use a GaN (gallium nitride)-type semiconductor laser having a wave length A of 450 nm or so. The laser light source 11 is not limited to a particular material or method, as long as it has a wavelength compatible with a phosphor; however, under current situations, a GaN-type semiconductor laser is preferable as it realizes a high output with a small size and at a relatively affordable price.

The collimator 12 is arranged on an optical axis of laser light from the laser light source 11. The collimator 12 is comprised of a lens, and shapes incident light into a parallel light beam. The laser light emitted from the collimator 12 has both high directivity and coherence. If the laser light source 11 emits laser light having high directivity, the collimator 12 becomes unnecessary.

The light deflection device 13 is arranged on an optical axis of laser light from the laser light source 11. The light deflection device 13 is stationarily fixed to, for example, the reflection member 16 which will be described later. The plane of incidence of the light deflection device 13 is arranged so as to be substantially perpendicular to the traveling direction of the laser light from the collimator 12. The light deflection device 13 is comprised of a liquid crystal device including a liquid crystal layer. The light deflection device 13 transmits the laser light transmitted through the collimator 12, and deflects the laser light. The light deflection device 13 is comprised of a stack of a plurality of liquid crystal panels. The specific configuration of the light deflection device 13 will be described later.

The laser light emitted from the laser light source 11 is linear polarized light that vibrates along a particular polarization axis. The polarization direction (polarization axis) of the light deflection device 13 is set parallel to the polarization direction of the laser light. The polarization axis of the light deflection device 13 is a direction parallel to a plane in which a longitudinal axis (director) of liquid crystal molecules moves in accordance with an electric field.

The phosphor unit 14 has a plurality of phosphors having mutually different color temperatures. The phosphor unit 14 has five phosphors for example, as shown in FIG. 1. Each phosphor converts the wavelength of the laser light and emits illumination light (visible light) in a desired color. Specifically, after the phosphor absorbs the laser light and turns into an excited state, the phosphor emits light (fluorescent light) while reverting to its ground state. The phosphor unit 14 is stationarily fixed to the reflection member 15, for example.

The reflection member 15 is provided on a surface opposite to the laser light source 11 of the phosphor unit 14. The reflection member 15 has a plane shape, for example, and is comprised of a plane mirror, for example. The plane mirror 15 reflects illumination light transmitted through the phosphor unit 14. On the opposite surface of the plane mirror 15 to the phosphor, a heat releasing plate may be provided to suppress heat generation in the phosphor.

The reflection member 16 reflects the illumination light reflected by the plane mirror 15 in the same direction as the traveling direction of laser light from the laser light source 11. The reflection member 16 emits the illumination light reflected by the plane mirror 15 as a light beam substantially parallel to the optical axis of the laser light from the laser light source 11. The reflection member 16 is comprised of a concave mirror, for example. The above-described phosphor unit 14 is arranged in the vicinity of the focal point of the concave mirror 16. The concave mirror 16 includes an opening 16B to allow the laser light emitted from the light deflection device 13 to pass.

The concave mirror 16 has a reflection surface 16A consisting of a curved surface. When three-dimensionally viewed, the concave mirror 16 has a bowl-shaped reflection surface 16A. The concave mirror 16 may be made by forming a film of a light-reflective metal (for example, aluminum) on a base made of a resin, etc., for example.

If an ultraviolet wavelength is used as an excitation light, the transmissive filter 17 transmits light of which the wavelength is converted by the phosphor unit 14, and does not transmit ultraviolet rays. The transmissive filter 17 has a role of preventing leakage of ultraviolet light outside of the lamp, which has adverse effects on human bodies and causes degradation of other components. If a wavelength of the laser light source is used as a part of illumination light, a transmissive filter becomes unnecessary.

As shown in FIG. 1, the incident direction of excitation laser and the irradiation direction as lighting do not necessarily match, and an arrangement can be designed as appropriate in accordance with the desired specification, such as optical properties of a lighting apparatus and a size thereof.

[1-2] Configuration of Phosphor Unit 14

Next, the configuration of the phosphor unit 14 will be described. FIG. 2 is a cross-sectional view mainly illustrating the phosphor unit 14 shown in FIG. 1. FIG. 2 also shows how laser light emitted from the laser light source 11 is incident on the phosphor unit 14.

The phosphor unit 14 has a plurality of phosphors having different fluorescent colors, as described above. For example, in FIG. 2, the phosphor unit 14 consists of a phosphor 14-R emitting red light, a phosphor 14-G emitting green light, a phosphor 14-B emitting blue light, a phosphor 14-L emitting warm white color, and a phosphor 14-W emitting white light. As phosphors, a YAG (yttrium-aluminum-garnet)-type phosphor, a TAG (terbium-aluminum-garnet)-type phosphor, a SiAlON-type phosphor, a BOS (barium-orthosilicate)-type phosphor, a quantum dot phosphor, a perovskite phosphor, and a KSF ($K_2Si_6F:Mn^{4+}$) phosphor may be used.

The arrangements of the phosphors and the shape of the reflection member 15 where the phosphors are provided are not necessarily a flat plane, and may be in a curved shape or formed as steps in order to control a distribution of fluorescence intensity. The curved shape or the steps may be formed on the plane mirror with the use of a transparent resin.

As shown in FIG. 2, the angle of deflection of the laser light emitted from the laser light source 11 is controlled by the light deflection device 13, and the laser light is incident on any of the phosphors 14-R, 14-G, 14-B, 14-L, or 14-W. Each of the phosphors 14-R, 14-G, 14-B, 14-L, and 14-W converts the wavelength of the laser light, and emits illumination light of a desired color.

[1-3] Block Configuration of Lighting Apparatus 10

Figure 3:
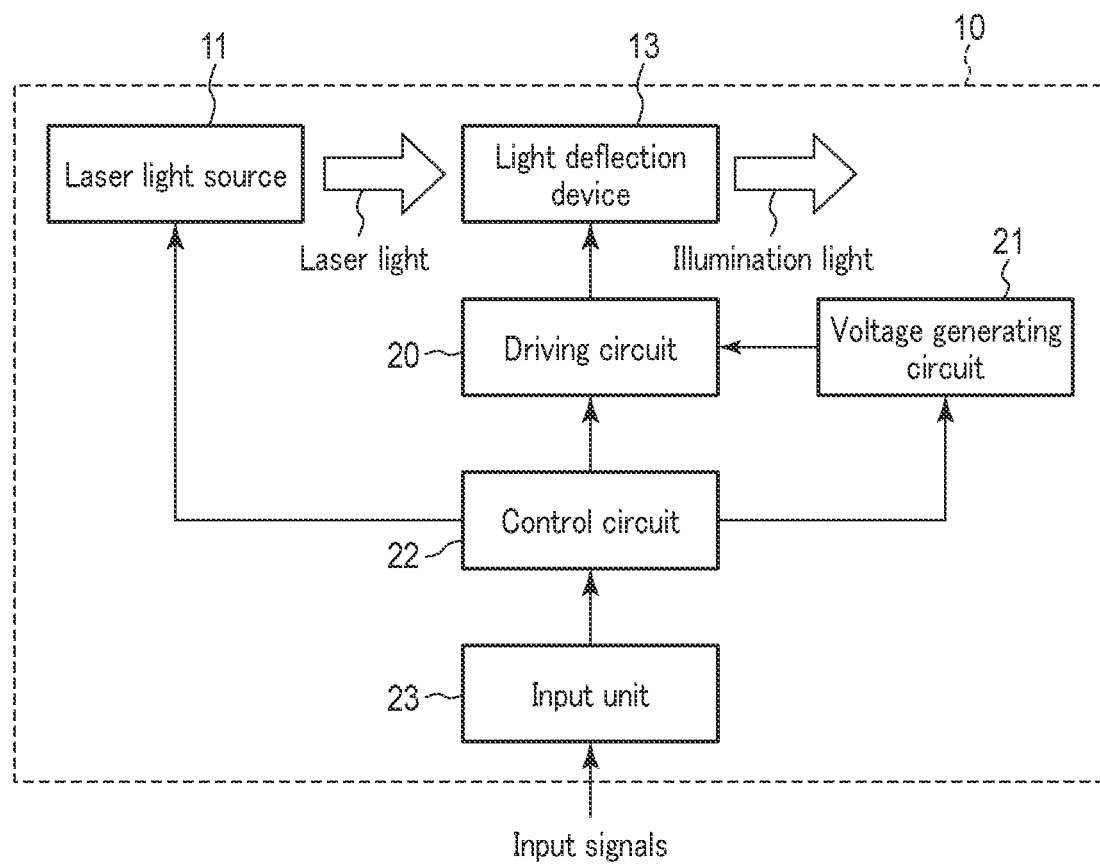
FIG. 3 is a block diagram of the lighting apparatus according to the first embodiment.

Next, the block configuration of the lighting apparatus 10 will be described. FIG. 3 is a block diagram of the lighting apparatus 10 according to the first embodiment. The lighting apparatus 10 includes a laser light source 11, a light deflection device 13, a driving circuit 20, a voltage generating circuit 21, a control circuit 22, and an input unit 23.

As will be described below, the light deflection device 13 includes a plurality of electrodes for controlling the alignment of a liquid crystal layer. The driving circuit 20 is electrically connected to the plurality of electrodes of the light deflection device 13. The driving circuit 20 drives the light deflection device 13 by applying a plurality of voltages to the light deflection device 13. Specifically, the driving circuit 20 controls the alignment of the liquid crystal layer included in the light deflection device 13.

The voltage generating circuit 21 generates a plurality of voltages necessary for operating the lighting apparatus 10, using an external power source. The voltage generated by the voltage generating circuit 21 is supplied to each module in the lighting apparatus 10, particularly to the driving circuit 20.

The input unit 23 receives input signals from the outside of the apparatus. The input signal includes a selection signal for selecting a color of illumination light. The input unit 23 sends the input signals to the control circuit 22.

The control circuit 22 controls the operation of the lighting apparatus 10 in an integrated manner. The control circuit 22 is capable of controlling the driving circuit 20 and the voltage generating circuit 21 based on an input signal sent from the input unit 23.

[1-4] Configuration of Light Deflection Device 13

Figure 4:
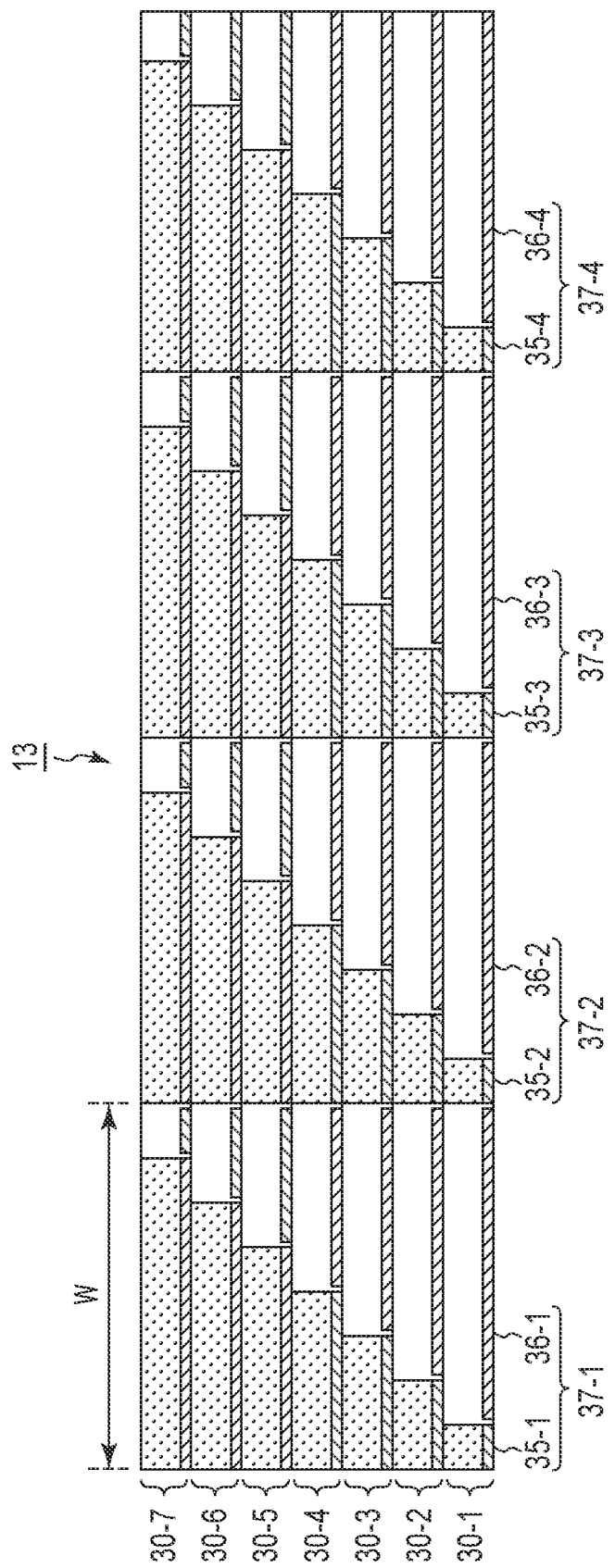
FIG. 4 is a cross-sectional view of a light deflection device shown in FIG. 1.

Next, the configuration of the light deflection device 13 will be described. FIG. 4 is a cross-sectional view of the light deflection device element 13 shown in FIG. 1.

The light deflection device 13 is comprised of a stack of a plurality of liquid crystal panels 30. FIG. 4 shows seven liquid crystal panels 30-1 through 30-7, as an example. The liquid crystal panels 30-1 through 30-7 are stacked using a transparent adhesive, for example.

Figure 5:
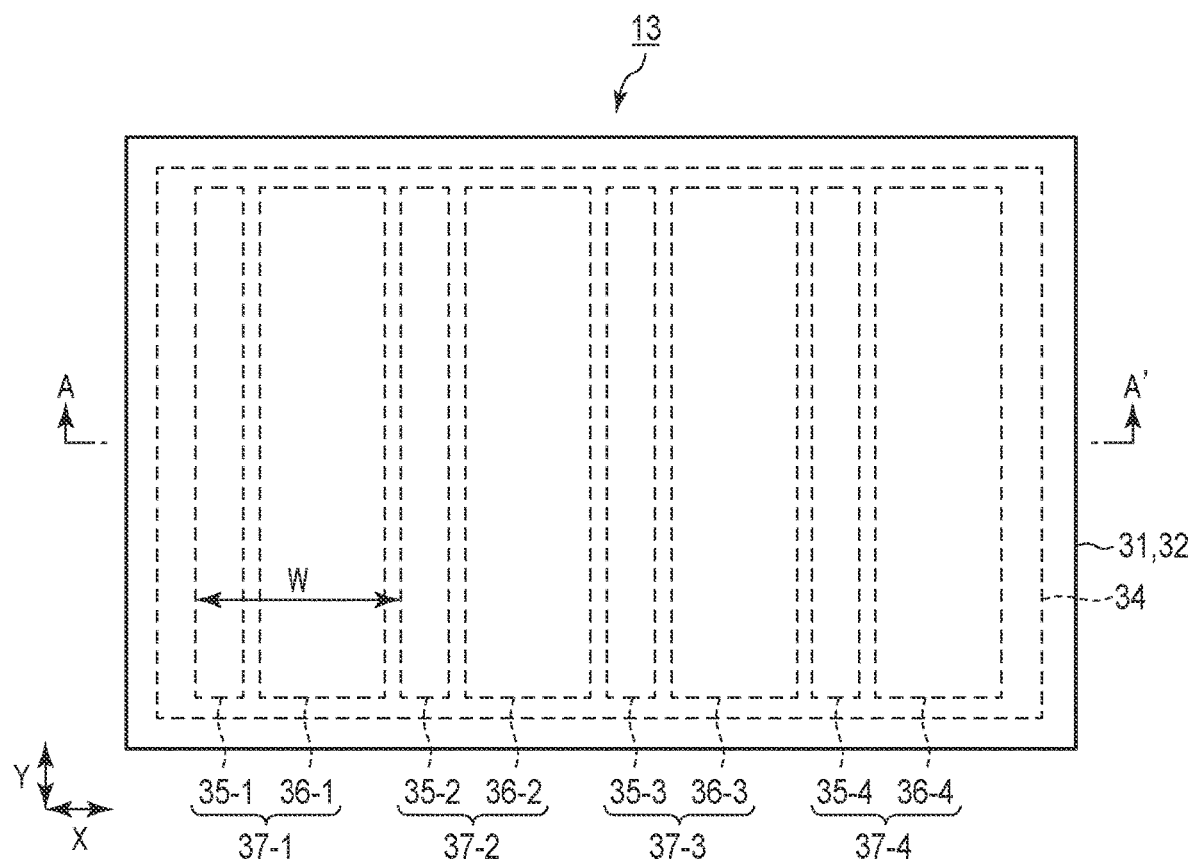
FIG. 5 is a plan view of one of liquid crystal panels shown in FIG. 4.
Figure 6:
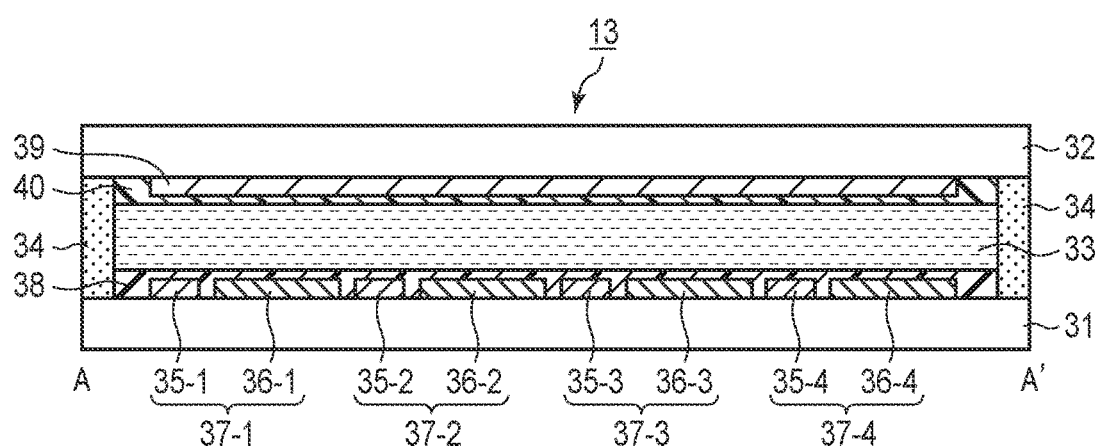
FIG. 6 is a cross-sectional view of the liquid crystal panel, along line A-A' shown in FIG. 5.

FIG. 5 is a plan view of one of the liquid crystal panels 30 shown in FIG. 4. FIG. 6 is a cross-sectional view of one of the liquid crystal panels 30 in line A-A' shown in FIG. 4.

The liquid crystal panel 30 is a transmissive liquid crystal device. The liquid crystal panel 30 includes substrates 31 and 32 facing each other, and a liquid crystal layer 33 held between the substrates 31 and 32. Each of the substrates 31 and 32 is constituted by a transparent substrate (such as a glass substrate or a plastic substrate). For example, the substrate 31 is arranged on the laser light source 11 side, and the laser light from the laser light source 11 is incident on the liquid crystal layer 33 from the substrate 31 side.

The liquid crystal layer 33 is filled between the substrates 31 and 32. Specifically, the liquid crystal layer 33 is sealed in an area enclosed by the substrates 31 and 32 and a seal member 34. The seal member 34 is made of, for example, an ultraviolet curable resin, a thermosetting resin, or a UV-curable thermosetting resin or the like, and in the manufacturing process thereof, it is applied to the substrate 31 or the substrate 32, and then cured by ultraviolet irradiation, heating or the like.

The alignment of the liquid crystal molecules in the liquid crystal material of the liquid crystal layer 33 is manipulated in accordance with a voltage (electric field) applied between the substrates 31 and 32, and the optical properties of the liquid crystal material is thereby changed. The liquid crystal panel 30 in the present embodiment is for example in a homogeneous mode (homogeneous alignment). In other words, a positive-type (P-type) nematic liquid crystal having positive dielectric anisotropy is used as the liquid crystal layer 33, and the liquid crystal molecules are aligned substantially horizontal to the substrate surface when no voltage (electric field) is applied. In the homogeneous mode, the long axis (director) of the liquid crystal molecules are aligned in substantially the horizontal direction when no voltage is applied, and the long axis of the liquid crystal molecules is inclined toward the perpendicular direction when a voltage is applied. The inclination angle of the liquid crystal molecules changes in accordance with an effective voltage applied thereon. The initial alignment of the liquid crystal layer 33 is controlled by two alignment films provided in each of the substrates 31 and 32, in such a manner that the liquid crystal layer 33 is sandwiched between the alignment films.

As a liquid crystal mode, a vertical alignment (VA) mode using a negative-type (N-type) nematic liquid crystal. In the VA mode, the long axis of the liquid crystal molecules is aligned in substantially a vertical direction when an electric field is not applied, and the long axis of the liquid crystal molecules is inclined toward the horizontal direction when a voltage is applied.

On the liquid crystal layer 33 side of the substrate 31, a plurality of electrodes 35 and a plurality of electrodes 36, both extending in a Y-direction, are provided. The plurality of electrodes 35 and the plurality of electrodes 36 are alternately arranged along with an X-direction orthogonal to the Y-direction. The plurality of electrodes 35 have the same width (the length in the X-direction). The plurality of electrodes 36 have the same width. FIGS. 5 and 6 show four electrodes 35-1 through 35-4, and four electrodes 36-1 through 36-4, as an example. The plurality of electrodes 35 and 36 are evenly spaced, and the interval is for example a minimum processing size, which results from a manufacturing step when the electrodes were processed.

A pair of one electrode 35 and one electrode 36 constitutes a repetition unit 37. FIGS. 5 and 6 show four repetition units 37-1 through 37-4. The width (cyclic width) of one repetition unit 37 is referred to as W. The liquid crystal panels 30-1 through 30-7 have the same cyclic width W.

On the substrate 31, and the electrodes 35 and 36, an alignment film 38 that controls an initial alignment of the liquid crystal layer 33 is provided.

On the liquid crystal layer 33 side of the substrate 32, a single common electrode 39 is provided. The common electrode 39 is provided in a planar manner entirely on the substrate 32. The alignment film 40 for controlling the initial alignment of the liquid crystal layer 33 is provided on the substrate 32 and the common electrode 39. Alternatively, the common electrode 39 may be arranged on the substrate 31, and the electrodes 35 and 36 may be arranged on the substrate 32.

Each of the electrodes 35 and 36, and the common electrode 39 is comprised of a transparent electrode, and for example, an indium tin oxide (ITO) is used.

FIG. 4 shows four repetition units 37-1 through 37-4 as an example. As described above, the liquid crystal panels 30-1 through 30-7 have the same width (cyclic width W) of the repetition unit 37. In FIG. 4, only the electrodes 35 and 36 included in the liquid crystal panels 30 are shown to simplify the drawing; however, an actual cross-sectional structure is as shown in FIG. 5. In FIG. 4, the area occupied by the electrodes 35 in the liquid crystal panel 30 is shown by dotted hatching, and the area occupied by the electrodes 36 is not hatched.

In the liquid crystal panels 30-1 through 30-7, seven electrodes 35 included in seven repetition units 37 of the same row are arranged in ascending order of length from the liquid crystal panel 30-1 to the liquid crystal panel 30-7. In the liquid crystal panels 30-1 through 30-7, seven electrodes 36 included in seven repetition units 37 of the same row are arranged in descending order of length from the liquid crystal panel 30-1 to the liquid crystal panel 30-7.

In other words, seven electrodes 35 of the same row are formed in the shape of inverted steps. The increments of the seven electrodes 35 are constant. Seven electrodes 35 of the same row are arranged in a manner such that the left sides thereof are aligned. For example, the width of the shortest electrode 35 (the electrode 35 of the liquid crystal panel 30-1) is the minimum value of 50 µm, and the width of the longest electrode 35 (the electrode 35 of the liquid crystal panel 30-7) is the maximum value of 350 µm, with the width becoming greater by 50 µm for each liquid crystal panel 30.

Seven electrodes 36 of the same row are formed in the shape of steps. The increments of the seven electrodes 36 are constant. Seven electrodes 36 of the same row are arranged in a manner such that the right sides thereof are aligned. For example, the width of the longest electrode 36 (the electrode 36 of the liquid crystal panel 30-1) is the maximum value of 350 µm, and the width of the shortest electrode 36 (the electrode 36 of the liquid crystal panel 30-7) is the minimum value of 50 µm, with the width becoming smaller by 50 µm for each liquid crystal panel 30.

The stacking order of the liquid crystal panels 30-1 through 30-7 is not limited to the one shown in FIG. 4, and the order may be discretionarily changed. In other words, as long as the light deflection device 13 has the liquid crystal panels 30-1 through 30-7 each having seven electrodes 35 of increasing widths and seven electrodes 36 of decreasing widths, the electrodes need not be arranged in a step-wise manner.

As the liquid crystal panel 30, a transmissive liquid crystal device (transmissive LCOS) using a liquid crystal on silicon (LCOS) method may be used. If a transmissive LCOS is used, it is possible to micromachine electrodes, thereby realizing a smaller liquid crystal panel 30. In the transmissive LCOS, a silicon substrate (or a silicon layer formed on a transparent substrate) is used. Since the silicon substrate transmits light having a wavelength longer than a particular length (including infrared rays) due to a band gap, it is possible to use an LCOS as a transmissive liquid crystal device. Through the use of the LCOS, a liquid crystal device having a smaller cell electrode can be realized, and it is thereby possible to downsize a liquid crystal device.

[1-5] Other Configuration Examples of Light Deflection Device 13

Figure 7:
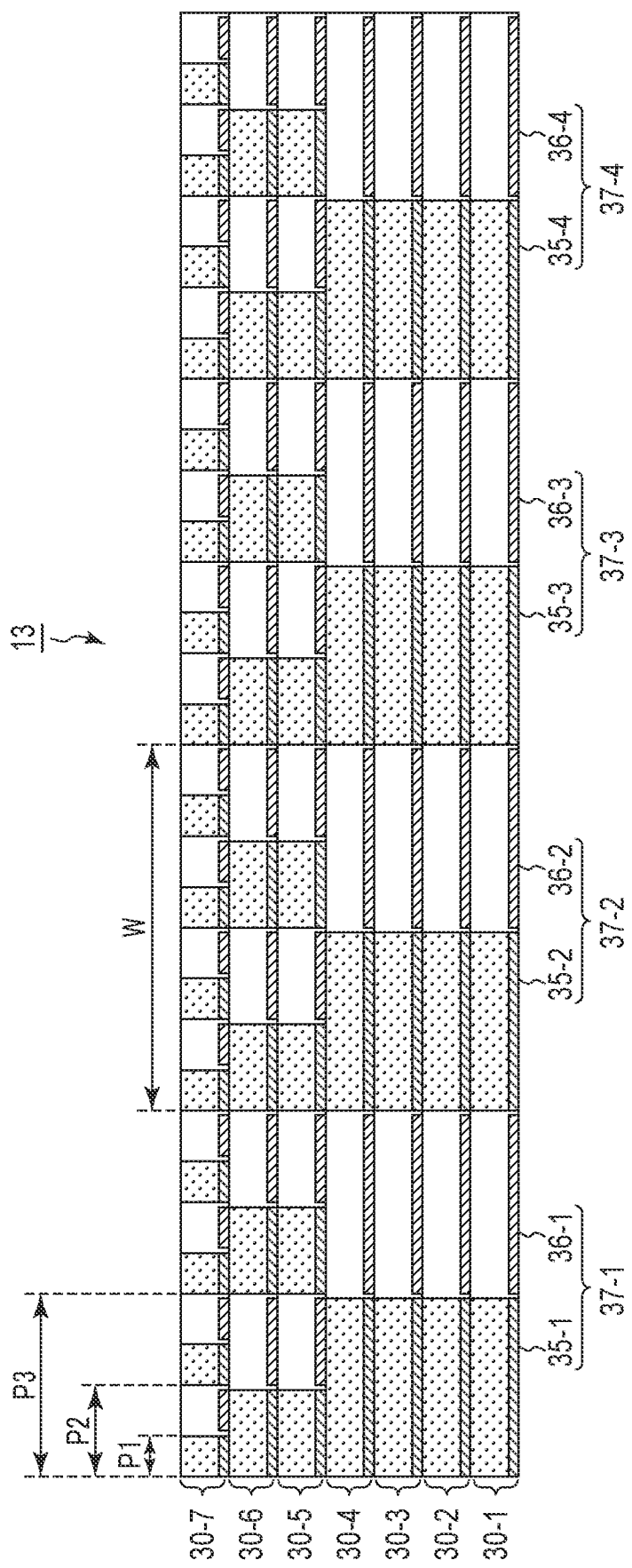
FIG. 7 is a cross-sectional view of a light deflection device according to another configuration example.

Next, other configuration examples of the light deflection device 13 will be described. FIG. 7 is a cross-sectional view of the light deflection device 13 according to a configuration example.

The light deflection device 13 is comprised of a stack of a plurality of liquid crystal panels 30. FIG. 7 shows seven liquid crystal panels 30-1 through 30-7 as an example. The liquid crystal panels 30-1 through 30-7 are stacked using a transparent adhesive, for example.

Figure 8:
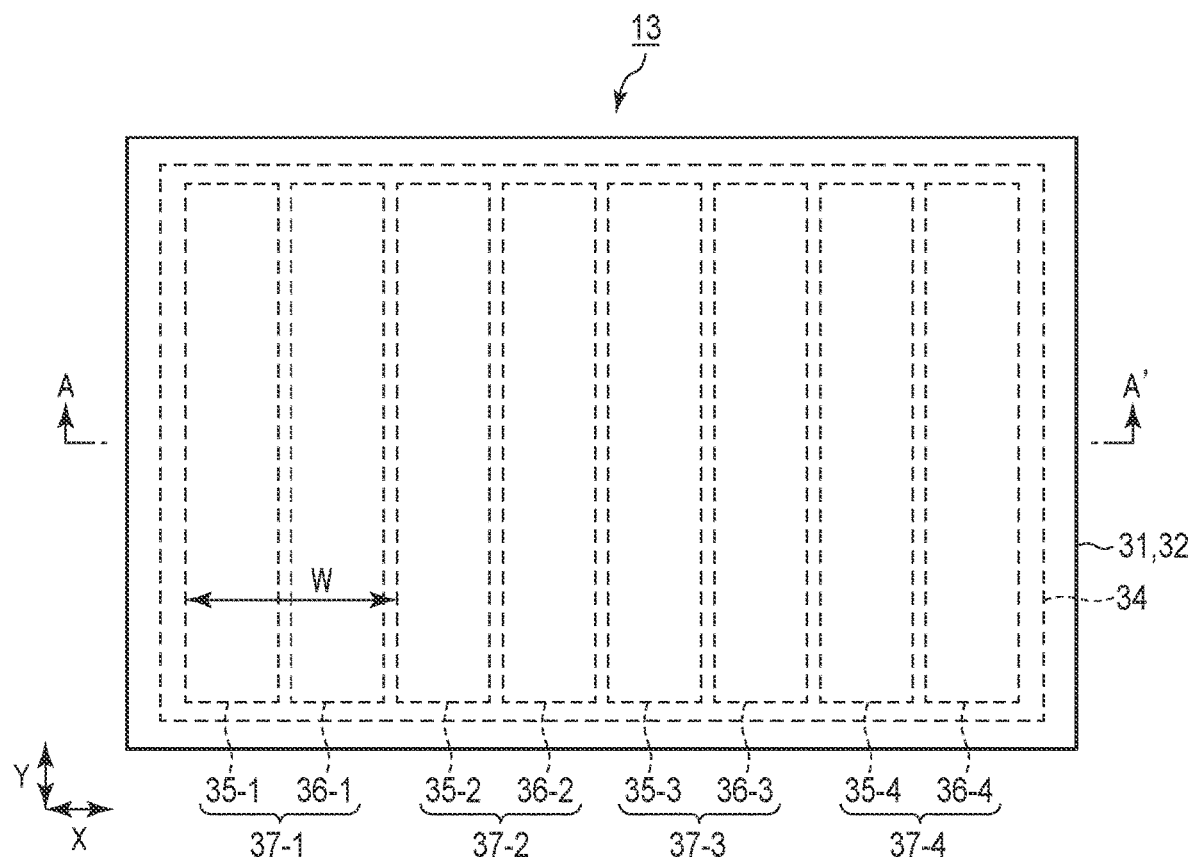
FIG. 8 is a plan view of one of liquid crystal panels shown in FIG. 7.
Figure 9:
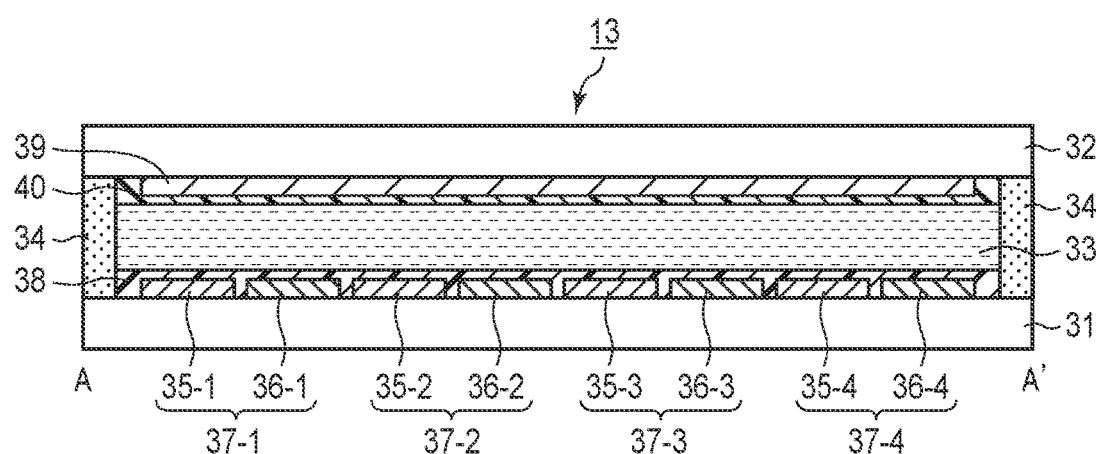
FIG. 9 is a cross-sectional view of the liquid crystal panel, along line A-A' shown in FIG. 8.

FIG. 8 is a plan view of one of the liquid crystal panels 30 shown in FIG. 7. FIG. 9 is a cross-sectional view of the liquid crystal panel 30 in line A-A' shown in FIG. 8.

On the liquid crystal layer 33 side of the substrate 31, the plurality of electrodes 35 and the plurality of electrodes 36, both extending in a Y-direction, are provided. The plurality of electrodes 35 and the plurality of electrodes 36 are alternately arranged along an X-direction orthogonal to the Y-direction. Each of the plurality of electrodes 35 and the plurality of electrodes 36 has the same width. FIGS. 8 and 9 show four electrodes 35-1 through 35-4 and four electrodes 36-1 through 36-4 as an example. The plurality of electrodes 35 and the plurality of electrodes 36 are equally spaced.

In FIG. 7, the plurality of electrodes 35 and the plurality of electrodes 36 included in the liquid crystal panel 30-7 have an electrode pitch P1. The electrode pattern of the liquid crystal panel 30-7 will be called pattern "a". In FIG. 7, only the electrodes 35 and 36 included in the liquid crystal panels 30 are shown to simplify the drawing; however, an actual cross-sectional structure is as shown in FIG. 8. In FIG. 7, the area occupied by the electrodes 35 in the liquid crystal panel 30 is shown by dot-hatching, and the area occupied by the electrodes 36 is not hatched.

Two liquid crystal panels 30-5 and 30-6 have the same structure. The plurality of electrodes 35 and the plurality of electrodes 36 included in the liquid crystal panel 30-5 have an electrode pitch P2. The liquid crystal panel 30-6 also has the electrode pitch P2. The electrode pattern of the liquid crystal panels 30-5 and 30-6 will be called pattern "b". The electrode pitch P2 of the pattern "b" is twice the electrode pitch P1 of the pattern "a".

Four liquid crystal panels 30-1 and 30-4 have the same structure. The plurality of electrodes 35 and the plurality of electrodes 36 included in the liquid crystal panel 30-1 have an electrode pitch P3. The liquid crystal panels 30-2 through 30-4 also have the electrode pitch P3. The electrode pattern of the liquid crystal panels 30-1 through 30-4 will be called pattern "c". The electrode pitch P3 of the pattern "c" is twice the electrode pitch P2 of the pattern "b".

In the liquid crystal panel 30-1 having a maximum electrode width, a pair of one electrode 35 and one electrode 36 is a repetition unit 37, and the repetition unit 37 has a cyclic width W. The gradient of refractivity repeats for each cyclic width W. FIG. 7 shows an example where the liquid crystal panel 30-1 has four repetition units 37-1 through 37-4.

In the configuration example of the light deflection device 13 having seven liquid crystal panels 30-1 through 30-7, the light deflection device 13 can be configured through using three types of liquid crystal panels, patterns "a", "b", and "c".

Even in a case where the number of stacked liquid crystal panels 30 is increased, the relationship between the electrode pitch and the electrode pattern similar to the above is applied. For example, in the case of the configuration example where the light deflection device 13 has 15 liquid crystal panels 30, four liquid crystal panels each having four electrode patterns can constitute the light deflection device 13.

If the relationship between the plurality of liquid crystal panels is generalized, the number of liquid crystal panels having the electrode pitch of $2^{(n-1)}$ times larger than the electrode pitch P1 of the pattern "a", which is a minimum pattern, is $2^{(n-1)}$. Herein, n is a natural number 1 or greater. Furthermore, n is incremented to 2, at minimum. The plurality of liquid crystal panels are stacked so as to satisfy the above relationship, thereby forming the gradient of refractivity in the light deflection device 13.

Specifically, the electrode pitch P2 of the pattern "b" is twice the electrode pitch P1 of the pattern "a"; therefore, the number of liquid crystal panels of the pattern "b" is two. Since the electrode pitch P3 of the pattern "c" is four times larger than the electrode pitch P1 of the pattern "a", the number of liquid crystal panels of the pattern "c" is four. If the number of stacked liquid crystal panels 30 is three or more, the above relationship holds true. If the electrode pitch P1 of the liquid crystal panel 30-7 is 50 μm, the electrode pitch P2 of the liquid crystal panels 30-5 and 30-6 are 100 μm, and the electrode pitch P3 of the liquid crystal panels 30-1 through 30-4 are 200 μm.

As long as the number of each of the liquid crystal panel patterns "a", "b", and "c" is predefined, the stacking order is not necessarily the same as the one shown in FIG. 7. In other words, it is unnecessary to stack the liquid crystal panels of the same patterns in a row.

[1-6] Interconnect Configuration of Light Deflection Device 13

Figure 10:
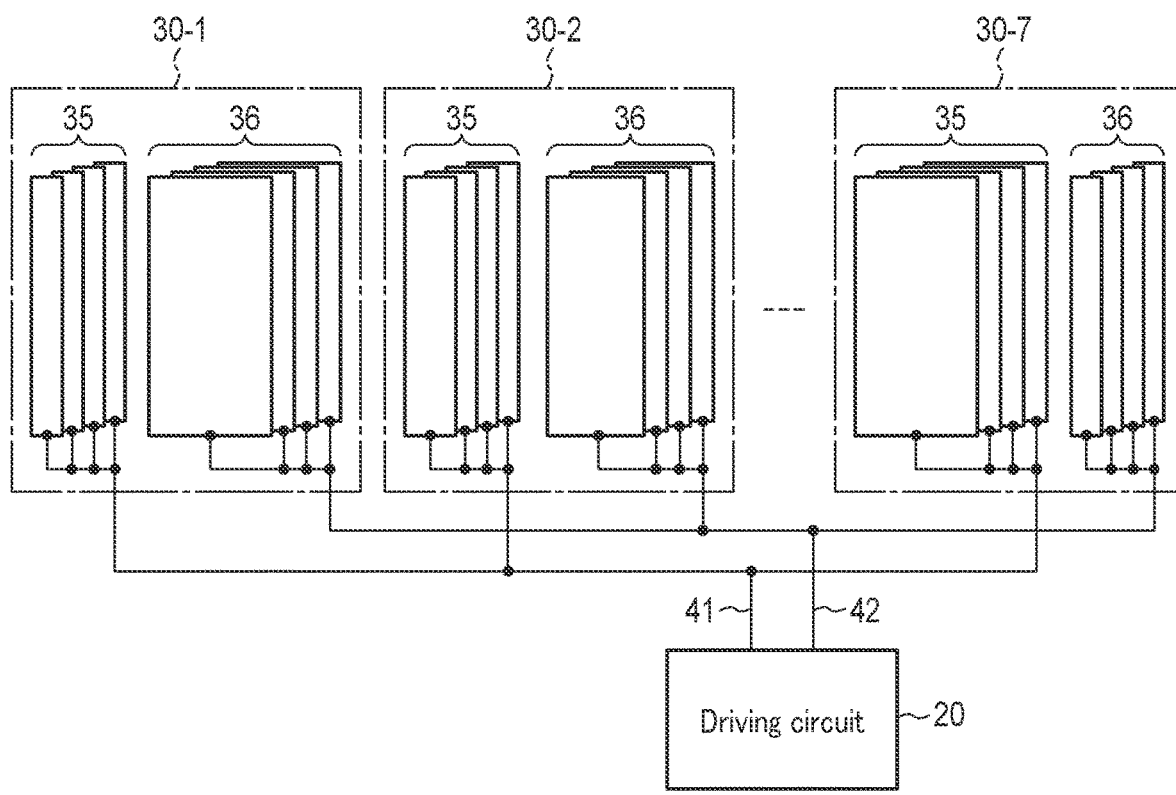
FIG. 10 is a schematic view of an interconnection structure of a light deflection device.

Next, the interconnect configuration of the light deflection device 13 will be described. FIG. 10 is a schematic diagram showing the interconnect configuration of the light deflection device 13.

As described above, the light deflection device 13 is comprised of a stack of a plurality of liquid crystal panels 30 (for example, seven liquid crystal panels 30-1 through 30-7). Each liquid crystal panel 30 includes a plurality of electrodes 35 (for example, four electrodes 35), and a plurality of electrodes 36 (for example, four electrodes 36). The plurality of electrodes 35 included in the liquid crystal panels 30-1 through 30-7 have different sizes, and the plurality of electrodes 36 included in the liquid crystal panels 30-1 through 30-7 also have different sizes. One electrode 35 and one electrode 36 constitute a repetition unit 37.

The plurality of electrodes 35 included in the liquid crystal panels 30-1 through 30-7 are connected in common to an interconnect 41. The plurality of electrodes 36 included in the liquid crystal panels 30-1 through 30-7 are connected to an interconnect 42 in common. The interconnect 41 and 42 are also connected to the driving circuit 20. In other words, the same voltage is applied to the plurality of electrodes 35 included in the liquid crystal panels 30-1 through 30-7, and the same voltage is applied to the plurality of electrodes 36 included in the liquid crystal panels 30-1 through 30-7.

Although not shown, the driving circuit 20 is also electrically connected to the common electrode 39 of each liquid crystal panel. The driving circuit 20 applies a common voltage (for example, 0 V) to the common electrode 39.

[2] Operation

Next, the operation of the lighting apparatus 10 configured as explained above will be described.

As shown in FIG. 1, the laser light source 11 emits laser light having a desired wavelength in accordance with the control of the control circuit 22. The laser light from the laser light 11 transmits the collimator 12, and the collimator 12 shapes the laser light into a parallel light beam.

The laser light transmitted through the collimator 12 is incident vertically (at the incident angle=0) on the laser deflection device 13. In accordance with the control of the control circuit 22, the light deflection device 13 deflects the laser light of the deflection angle θ. Specifically, as shown in FIG. 2, the light deflection device 13 selects one of the plurality of phosphors (for examples, 14-R, 14-G, 14-B, 14-L, and 14-W) included in the phosphor unit 14. Then, the laser light deflected by the light deflection device 13 is incident on one of the plurality of phosphors included in the phosphor unit 14. The phosphor unit 14 emits illumination light (visible light) of a desired color.

The illumination light emitted from the phosphor unit 14 is reflected by the plane mirror 15. The illumination light reflected by the plane mirror 15 is reflected by the concave mirror 16, and emitted as a light beam substantially parallel to the optical axis of the laser light source 11. The laser light reflected by the concave mirror 16 is transmitted through the transmissive filter 17 and then externally emitted.

Figure 11:
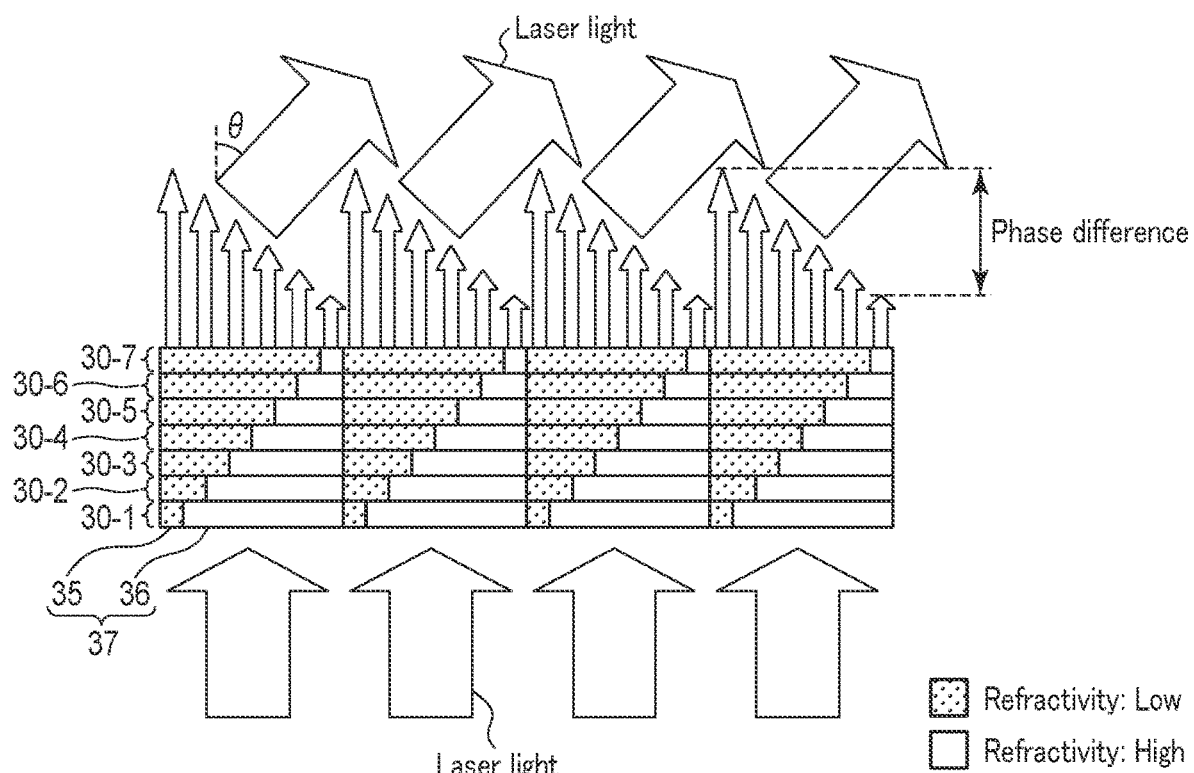
FIG. 11 is a schematic cross-sectional view illustrating a deflection operation of a light deflection device.

Next, the deflection operation of the deflection device 13 will be described in more detail. FIG. 11 is a schematic cross-sectional view explaining deflection operation of the light deflection device 13. FIG. 11 shows an example in which the light deflection device 13 deflects laser light at the deflection angle of θ on the right. In FIG. 11, the area occupied by the electrodes 35 (not shown) is indicated by dot-hatching, and the area occupied by the electrode 36 (not shown) is not hatched.

The driving circuit 20 applies a voltage V1 to all the electrodes 35 included in the light deflection device 13, and applies a voltage V2 (<V1, for example V2=0 V) to all the electrodes 36 and all the common electrodes 39. The polarities of the voltages V1 and V2 are reversed every predetermined time, in other words, alternate-current driving is performed.

As a result, an electric field is applied to a liquid crystal layer in the area occupied by the electrodes 35, and the refractivity of the liquid crystal layer becomes lower. In contrast, in the area occupied by the electrodes 36, no electric field is applied to the liquid crystal layer, and the refractivity of the liquid crystal layer remains high. In FIG. 11, refractivity of the liquid crystal layer is relatively high in the non-hatched area, and refractivity of the liquid crystal layer is relatively low in the dot-hatched area.

Each cyclic width W of the light deflection device 13 has an ascending gradient of refractivity toward the right. In the cyclic width W, there are most areas with low refractivity in the leftmost area, and most areas with high refractivity in the rightmost area. In the area having low refractivity, speed of light is fast, and in the area having high refractivity, speed of light is slow. In other words, there is a predetermined phase difference between the laser light transmitted through the area having the lowest refractivity and the laser light transmitted through the area having the highest refractivity. Thus, in the example shown in FIG. 11, the light deflection device 13 can deflect the laser light to the right. If the laser light needs to be deflected to the left, the voltage relationship between the electrodes 35 and the electrodes 36 should be an inversion of the voltage relationship shown in FIG. 11.

Furthermore, it is possible to form a gradient of refractivity in the light deflection device 13 by using only a single voltage other than 0 V. In other words, it is possible to make the voltage control of the control circuit 22 easier to achieve. It is possible to change the gradient of refractivity in magnitude through changing the level of the voltage V1 applied to the electrodes 35. It is thus possible to control the deflection angle θ of the light deflection device 13, and to change the light path of the laser light.

It is also possible to express an intermediate color tone if the light deflection device 13 switches the plurality of phosphors at a high speed and selects one of them.

Figure 12:
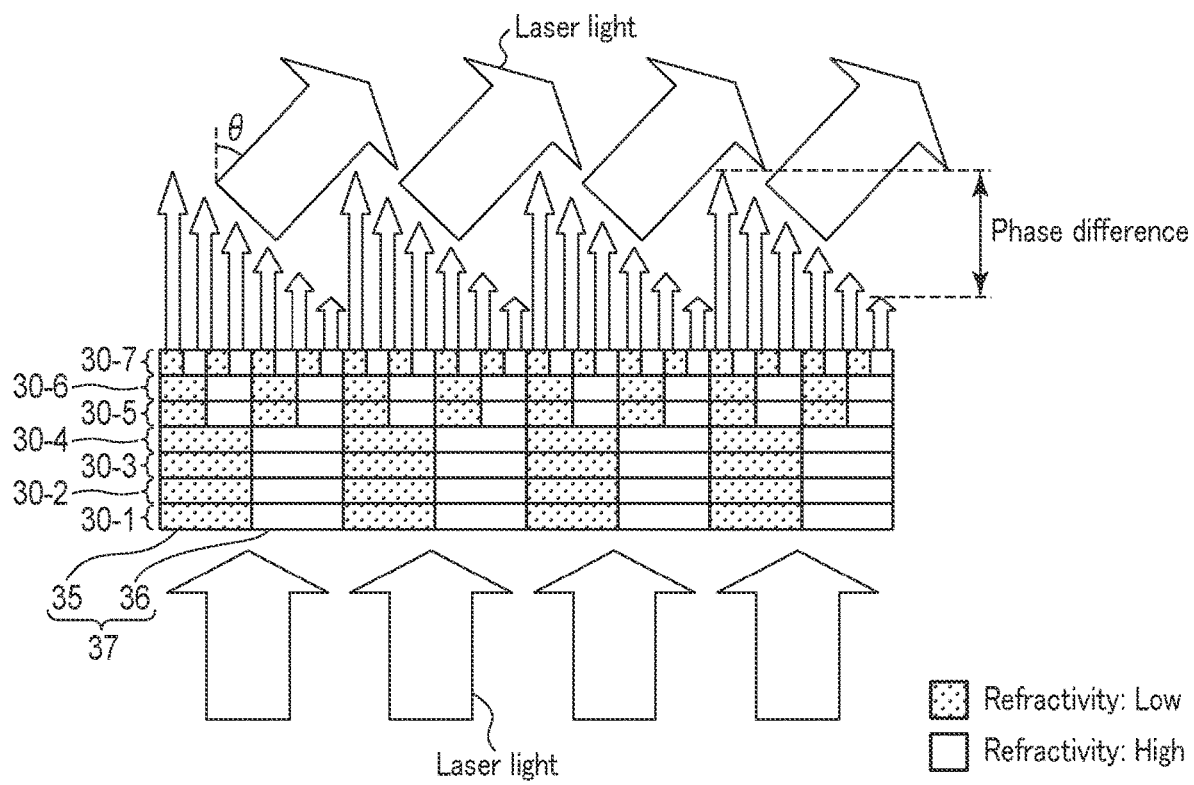
FIG. 12 is a schematic cross-sectional view illustrating a deflection operation of the light deflection device shown in FIG. 7.

FIG. 12 is a schematic cross-sectional view illustrating the deflection operation of the light deflection device 13 shown in FIG. 7. The voltage control of the electrodes 35 and the electrodes 36 is the same as the control in the case shown FIG. 11. A similar deflection operation can be realized in the light deflection device 13 shown in FIG. 7.

Suppose the deflection angle is θ, the cyclic width of the repetition unit is W, the phase difference (retardation) within the cyclic width W is $R_e$, the refractivity anisotropy of the liquid crystal layer is Δn, and the total of the liquid crystal gap of all the liquid crystal panels is d, and the change pitch of the electrode width is p. The liquid crystal gap denotes a distance between two substrates of the liquid crystal panels, or a thickness of the liquid crystal layer. In the present embodiment, the total of the liquid crystal gap of seven liquid crystal panels 30-1 through 30-7 is "d". Suppose the liquid crystal molecules of the liquid crystal panels are in a homogenous alignment, and the axis of deflection of an excitation laser is incident in parallel to the director of the liquid crystal molecules. The deflection angle θ is expressed by the expression (1) shown below, and the retardation $R_e$ is expressed by the expression (2) below.

$$\theta = a\ \sin(R_e/(W-p)) \quad (1)$$

$$R_e = \Delta n \cdot d \quad (2)$$

Herein, a sin means arcsine.

For example, if the refractivity anisotropy Δn=0.2 when the wavelength λ=450 nm, the gap of each liquid crystal panel 30 is 7 μm, the retardation of each liquid crystal panel 30 is 1750 nm, the change pitch p of the electrode width is 50 μm and the cyclic width W is 400 μm, the maximum deflection angle of one side is 2 degrees from the expressions (1) and (2).

Since the deflection angle due to the light deflection device 13 is ±2 degrees, if the distance between the light deflection device 13 and the phosphor unit 14 is 10 cm, it is possible to select an incident area of the phosphor unit 14 within the range of about ±0.35 cm (0.7 cm as a whole). If the width of one phosphor included in the phosphor unit 14 is 1000 μm, one phosphor can be selected from seven phosphors.

Through adjusting the liquid crystal gap, the liquid crystal material, and the electrode pitch in the light deflection device, it is possible to adjust the maximum deflection angle and response speed to demanded specification.

[3] Effects of First Embodiment

As described in detail above, the lighting apparatus 10 of the first embodiment includes a laser light source 11 emitting laser light, a light deflection device (liquid crystal device) 13 that transmits and refracts the laser light from the laser light source 11, and the phosphor unit 14 including a plurality of phosphors having different color temperatures. The phosphor unit 14 receives laser light from the light deflection device 13, converts a wavelength of the laser light and emits illumination light. The light deflection device 13 controls the angle of laser light, and selects one of the plurality of phosphors based on the control of the control circuit 22. The light deflection device 13 deflects laser light by forming a gradient of refractivity.

Thus, according to the first embodiment, it is possible to generate illumination light in a plurality of colors through the use of single-wavelength laser light. This not only reduces the cost of the lighting apparatus 10 but can also realize a laser lighting apparatus capable of controlling colors. Headlamps of automobiles are an example of the expected use for such laser lighting. Through maximizing the gain from the characteristics of laser lighting, it is possible to achieve lighting effects having excellent radiation distance with only small power consumption.

It is possible to configure a lighting apparatus 10 using a liquid crystal device without use of expensive electronic components or optical components. This not only reduces the cost of the lighting apparatus 10 but also power consumption of the lighting apparatus 10.

It is also possible to improve reliability of the lighting apparatus 10, as components requiring machine operations are not used. It is also possible to suppress an increase in the size and weight of the lighting apparatus 10.

Second Embodiment

Figure 13:
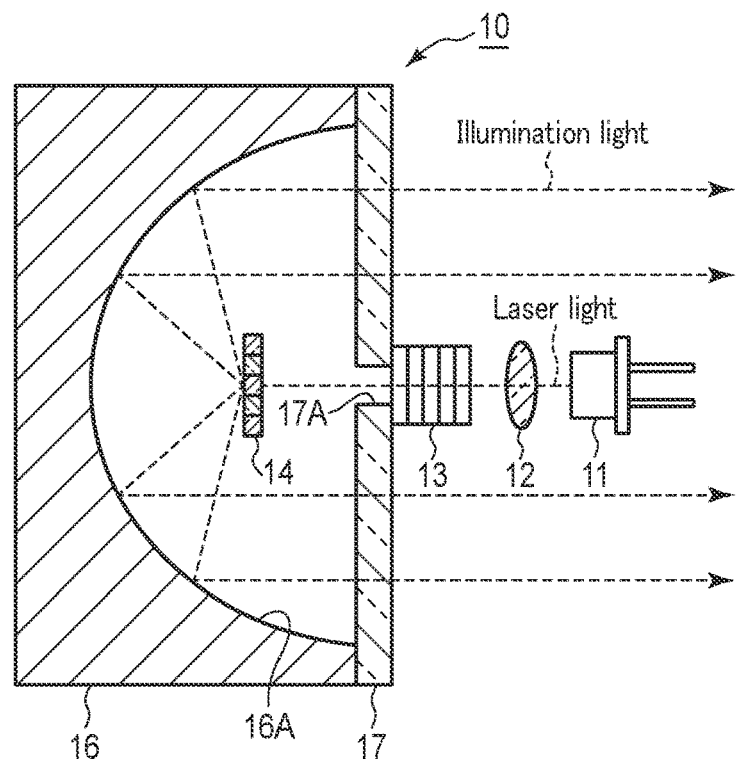
FIG. 13 is a cross-sectional view of a lighting apparatus according to a second embodiment.

The second embodiment is a configuration example in which the laser light source 11 is arranged on the reflection plane side of the concave mirror 16. FIG. 13 is a cross-sectional view of a lighting apparatus 10 according to the second embodiment.

The arrangement of the laser light source 11, the collimator 12, the light deflection device 13, and the phosphor unit 14 is the same as that shown in FIG. 1. The light deflection device 13 is stationarily fixed to the transmissive filter 17, for example. The transmissive filter 17 includes an opening 17A to let the laser light emitted from the light deflection device 13 pass.

The concave mirror 16 is provided on a surface opposite to the laser light source 11 of the phosphor unit 14. The concave mirror 16 reflects illumination light transmitted through the phosphor unit 14. The illumination light reflected by the concave mirror 16 is transmitted through the transmissive filter 17 and then externally emitted.

The circuit configuration that controls the laser light source 11 and the light deflection device 13 is the same as those in the first embodiment.

According to the second embodiment, the same advantageous effects as those achieved in the first embodiment can be achieved. In the second embodiment, the concave mirror 15 shown in the first embodiment is rendered unnecessary, making it thereby possible to reduce the number of components.

Third Embodiment

Figure 14:
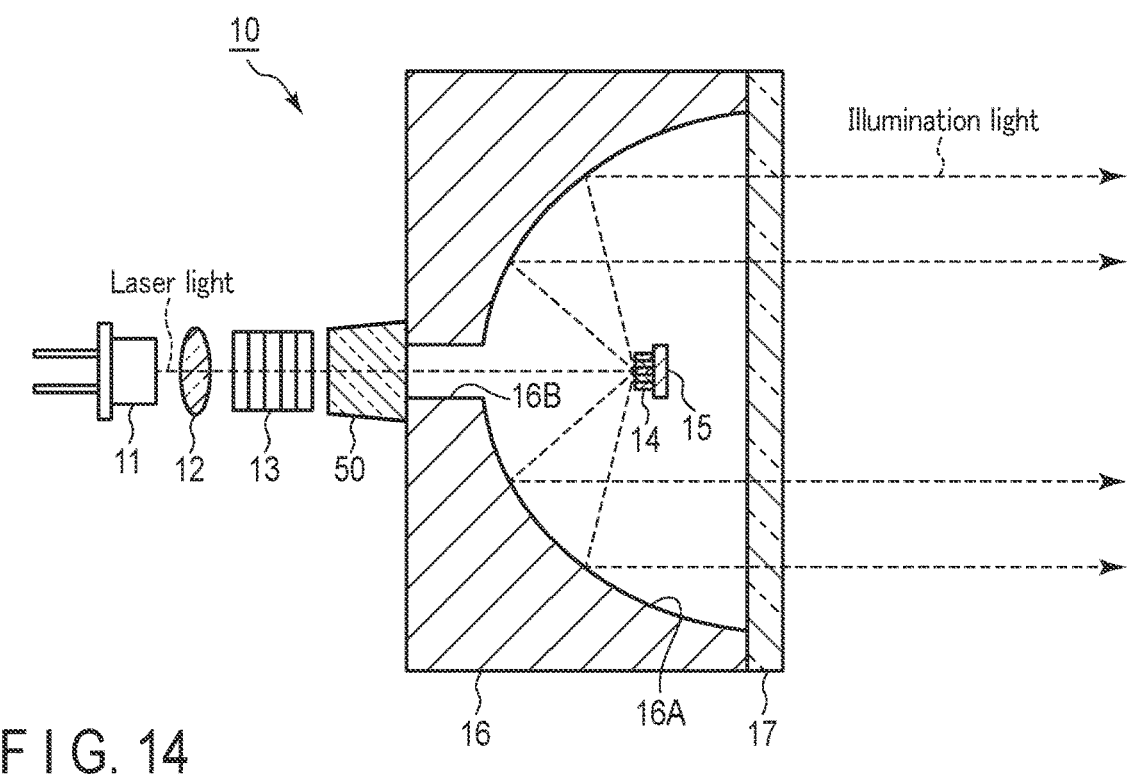
FIG. 14 is a cross-sectional view of a lighting apparatus according to a third embodiment.

The third embodiment is a modification of the first embodiment. FIG. 14 is a cross-sectional view of the lighting apparatus 10 according to the third embodiment. The lighting apparatus 10 includes a telecentric optical system 50 in addition to the structures shown in FIG. 1.

The telecentric optical system 50 is arranged between the light deflection device 13 and the concave mirror 16. The telecentric optical system 50 is stationarily fixed to the concave mirror 16, for example. The telecentric optical system 50 refracts an incident light beam in such a manner that the light becomes parallel to the optical axis of the laser light source 11. Specifically, the telecentric optical system 50 is comprised of a plurality of lenses having different functions.

FIG. 15 is a cross-sectional view mainly illustrating a telecentric optical system 50 shown in FIG. 14. The light deflection device 13 deflects laser light. The laser light emitted from the light deflection device 13 is refracted by the telecentric optical system 50 so as to become parallel to the optical axis of the laser light source 11. The laser light transmitted through the telecentric optical system 50 is substantially perpendicularly incident on one of the phosphors 14-R, 14-G, 14-B, 14-L, and 14-W included in the phosphor unit 14.

In the third embodiment, it is possible to collect laser light into a smaller area by using the telecentric optical system 50. It is thereby possible to reduce an area size of the phosphors. As a result, it is possible to reduce cost, and to design a lighting apparatus maximizing the gain from the characteristics of a point light source.

Fourth Embodiment

Figure 16:
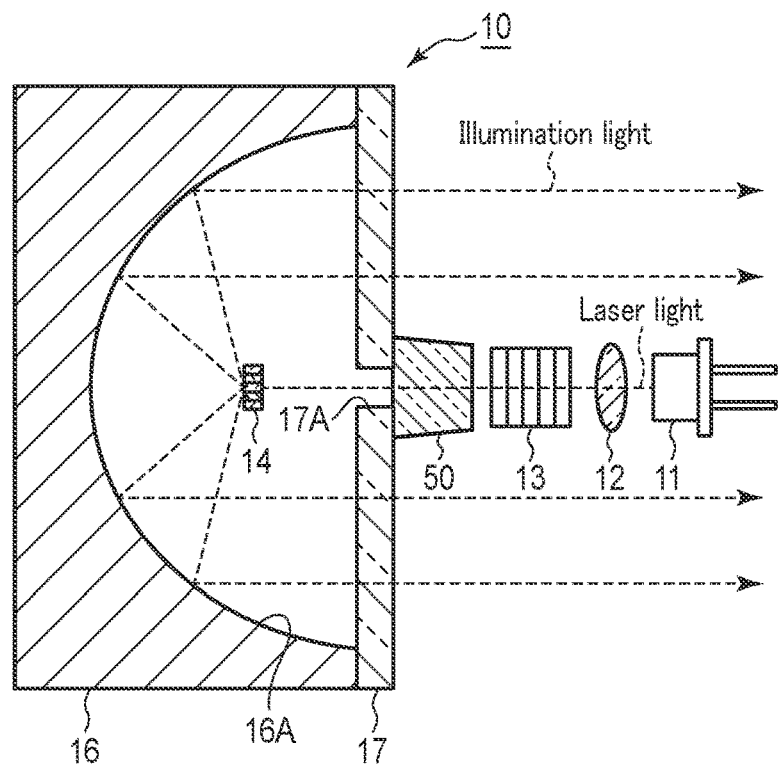
FIG. 16 is a cross-sectional view of a lighting apparatus according to a fourth embodiment.

The fourth embodiment is a modification of the second embodiment. FIG. 16 is a cross-sectional view of the lighting apparatus 10 according to the fourth embodiment. The lighting apparatus 10 includes the telecentric optical system 50 in addition to the structures shown in FIG. 13.

The telecentric optical system 50 is arranged between the light deflection device 13 and the transmissive filter 17. The telecentric optical system 50 is stationarily fixed to the transmissive filter 17, for example. The function of the telecentric optical system 50 is the same as that in the third embodiment.

Also in the fourth embodiment, it is possible to collect laser light into a smaller area by using the telecentric optical system 50. It is thereby possible to achieve the same advantageous effects as those of the third embodiment.

Fifth Embodiment

In the fifth embodiment, a diffraction grating having a liquid crystal layer is used as a device which deflects laser light. One or two or more phosphors of the plurality of phosphors are then selected by using diffracted light of multiple orders emitted from the diffraction grating.

[1] Configuration of Lighting Apparatus 10

[1-1] Cross-sectional Configuration of Lighting Apparatus 10

Figure 17:
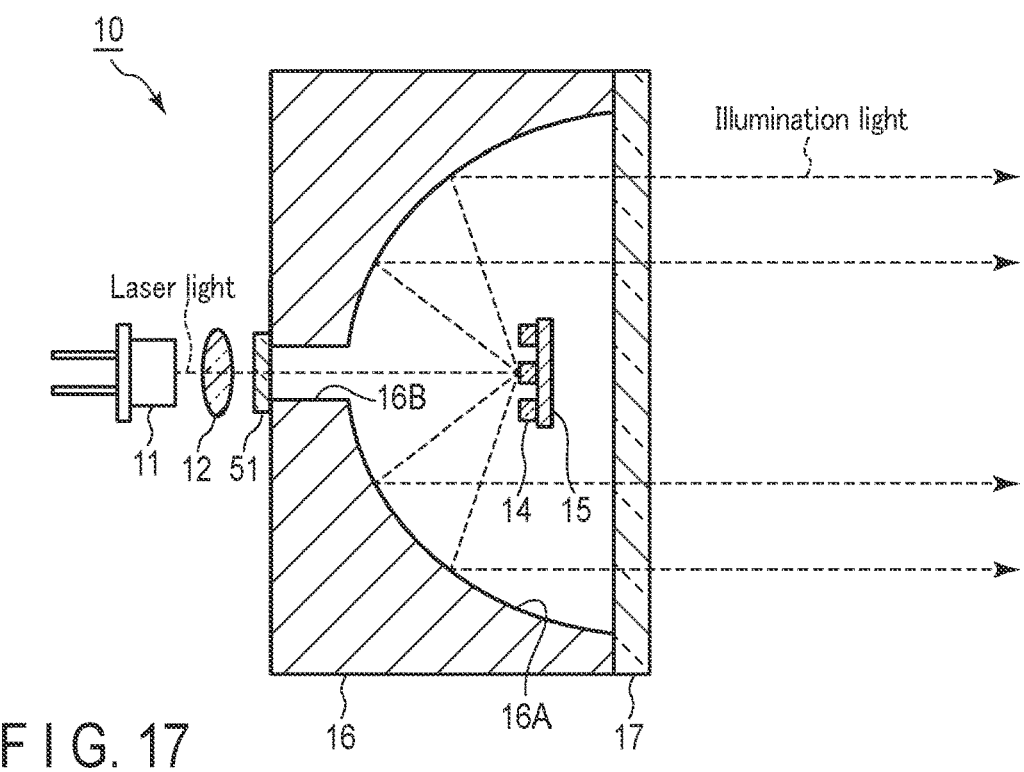
FIG. 17 is a cross-sectional view of a lighting apparatus according to a fifth embodiment.

FIG. 17 is a cross-sectional view of the lighting apparatus 10 according to the fifth embodiment.

The lighting apparatus 10 includes a laser light source 11, a collimator 12, a diffraction grating (liquid crystal diffraction grating) 51, a phosphor unit 14, a reflection member (plane mirror) 15, a reflection member (concave mirror) 16, and a transmissive filter 17. In FIG. 17, fixing members for fixing the laser light source 11, the collimator 12, the diffraction grating 51, the phosphor unit 14, the reflection member 15, the reflection member 16, and the transmissive filter 17 are omitted; however, those modules are fixed by a plurality of fixing members (not shown) at the positions shown in FIG. 17. The configurations of the laser light source 11, the collimator 12, the plane mirror 15, the plane mirror 16, and the transmissive filter 17 are the same as those of the first embodiment.

The diffraction grating 51 is arranged on an optical axis of laser light from the laser light source 11. The diffraction grating 51 is stationarily fixed to the concave mirror 16. The plane of incidence of the diffraction grating 51 is arranged so as to be substantially perpendicular to the traveling direction of the laser light from the collimator 12. The diffraction grating 51 is comprised of a liquid crystal device including a liquid crystal layer. The diffraction grating 51 transmits laser light transmitted through the collimator 12, and diffracts the laser light. The specific configuration of the diffraction grating 51 will be described later.

The laser light emitted from the laser light source 11 is linear polarized light that vibrates along a particular polarization axis. The polarization direction (polarization axis) of the diffraction grating 51 is set parallel to the polarization direction of the laser light. The polarization axis of the diffraction grating 51 is a direction parallel to a plane on which the long axis (director) of the liquid crystal molecules move in accordance with an electric field.

The phosphor unit 14 has a plurality of phosphors having mutually different color temperatures. The phosphor unit 14 has three phosphors for example, as shown in FIG. 17. The phosphor unit 14 is stationarily fixed to the plane mirror 15, for example.

To obtain fluorescent light in a wide range of visible light, it is preferable to use a wavelength between blue and violet as the wavelength of laser light. In the present embodiment, a GaN (gallium nitride)-type semiconductor laser having a wavelength λ of around 450 nm is used.

[1-2] Configuration of Phosphor Unit 14

Figure 18:
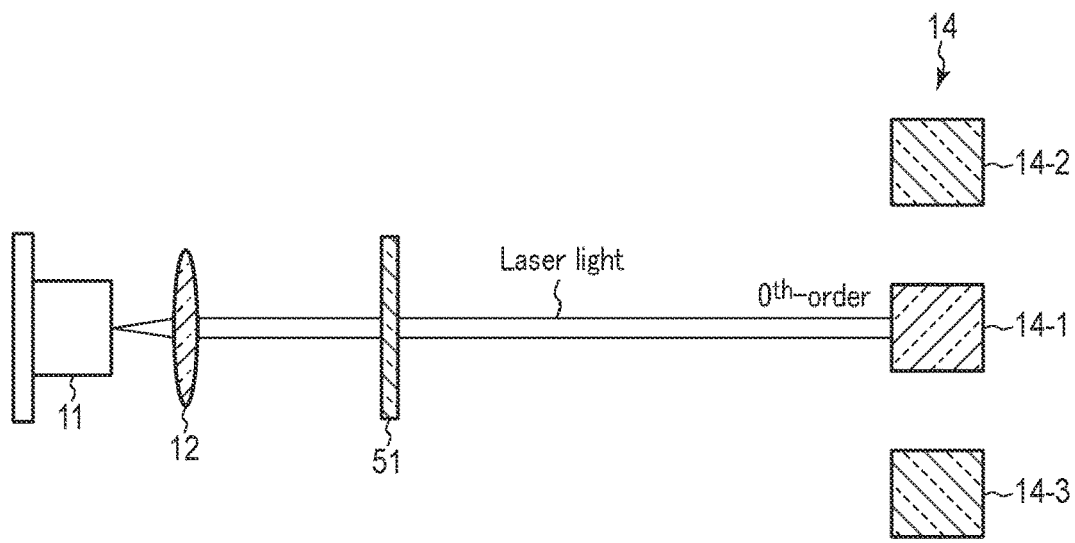
FIG. 18 is a cross-sectional view mainly illustrating a phosphor unit shown in FIG. 17.

Next, the configuration of the phosphor unit 14 will be described. FIG. 18 is a cross-sectional view mainly illustrating the phosphor unit 14 shown in FIG. 17. FIG. 18 also shows how laser light emitted from the laser light source 11 is incident on the phosphor unit 14.

The phosphor unit 14 has a plurality of phosphors having different color temperatures, as aforementioned. The phosphor unit 14 includes at least a phosphor of a low color temperature and a phosphor of a high color temperature. For example, in FIG. 18, the phosphor unit 14 includes a phosphor 14-1 emitting warm white light at a color temperature of around 3,000 K, and phosphors 14-2 and 14-3 emitting bluish white light at a color temperature of around 10,000 K.

The phosphor 14-1 is arranged at a position that allows the phosphor to receive 0th-order diffracted light emitted from the diffraction grating 51. The phosphor 14-2 is arranged at a position that allows the phosphor to receive positive first order diffracted light emitted from the diffraction grating 51. The phosphor 14-3 is arranged at a position that allows the phosphor to receive negative first order diffracted light emitted from the diffraction grating 51.

The arrangements of the phosphors and the shape of the reflection member 15 where the phosphors are provided are not necessarily a flat plane, and they may be formed in either a curved shape or a shape of steps in order to control a distribution of fluorescence intensity. The curved shape or steps may be formed on the plane mirror with the use of a transparent resin.

[1-3] Block Diagram of Lighting Apparatus 10

Figure 19:
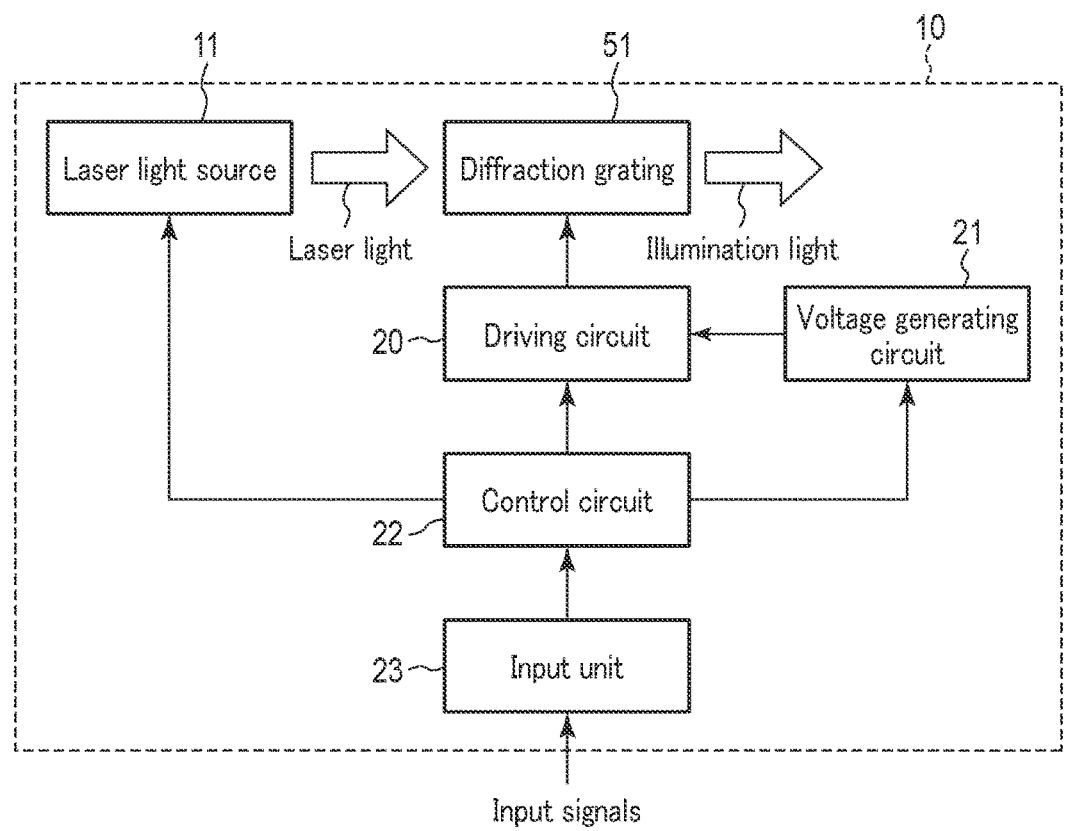
FIG. 19 is a block diagram of the lighting apparatus according to the fifth embodiment.

FIG. 19 is a block diagram of the lighting apparatus 10 according to the fifth embodiment. The lighting apparatus 10 includes a laser light source 11, a diffraction grating 51, a driving circuit 20, a voltage generating circuit 21, a control circuit 22, and an input unit 23.

As will be described below, the diffraction grating 51 includes a plurality of electrodes for controlling the alignment of a liquid crystal layer. The driving circuit 20 is electrically connected to the plurality of electrodes of the diffraction grating 51. The driving circuit 20 drives the diffraction grating 51 by applying a plurality of voltages to the diffraction grating 51. The other structures are the same as those in the first embodiment.

[1-4] Configuration of Diffraction Grating 51

Figure 20:
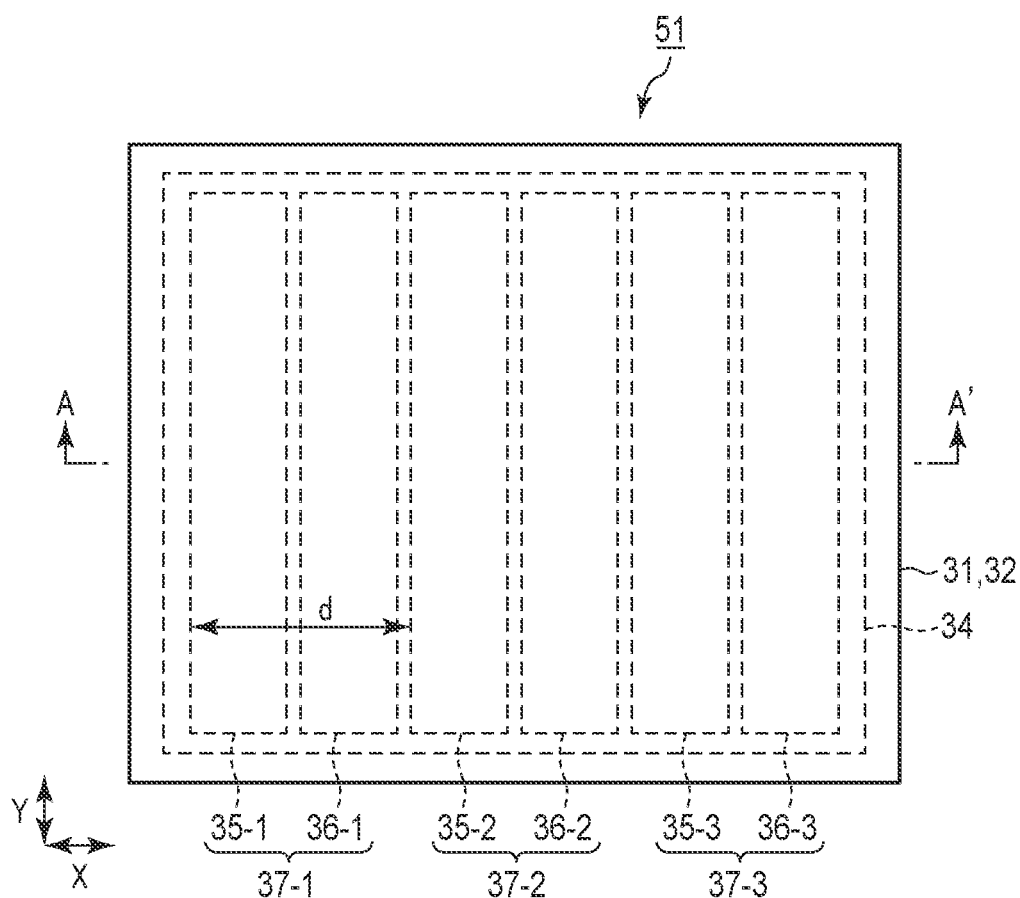
FIG. 20 is a plan view of a diffraction grating shown in FIG. 17.
Figure 21:
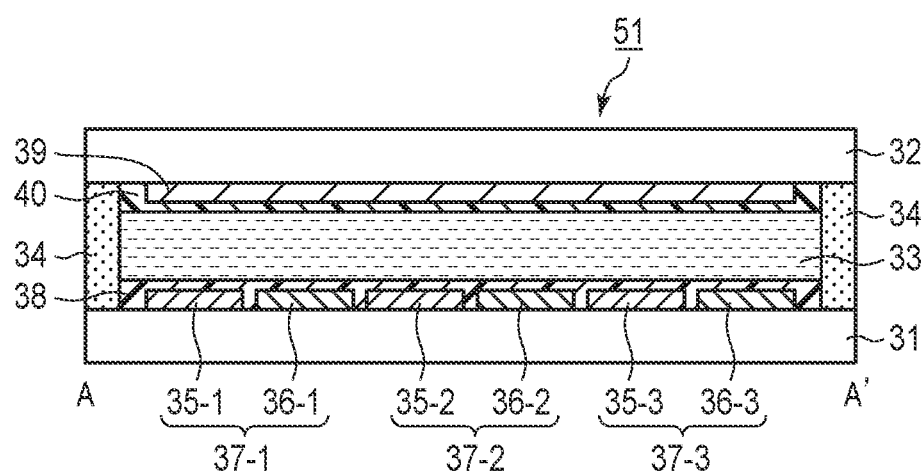
FIG. 21 is a cross-sectional view of the diffraction grating, along line A-A' shown in FIG. 20.

Next, the configuration of the diffraction grating 51 will be described. FIG. 20 is a plan view of the diffraction grating 51 shown in FIG. 17. FIG. 21 is a cross-sectional view of the diffraction grating 51, along line A-A' shown in FIG. 20. The configuration of the diffraction grating 51 is basically the same as that of one of the liquid crystal panels 30 (FIGS. 5 and 6) described in the first embodiment.

The diffraction grating 51 is a transmissive liquid crystal device. The diffraction grating 51 includes substrates 31 and 32 placed facing each other, a liquid crystal layer 33 held between the substrates 31 and 32, a seal member 34, and a plurality of electrodes 35, a plurality of electrodes 36, alignment films 38 and 40, and a common electrode 39.

On the liquid crystal layer 33 side of the substrate 31, a plurality of electrodes 35 and a plurality of electrodes 36, both extending in a Y-direction, are provided. The plurality of electrodes 35 and the plurality of electrodes 36 are alternately arranged along with an X-direction orthogonal to the Y-direction. Each of the plurality of electrodes 35 and the plurality of electrodes 36 has the same width (a length in an X-direction). FIGS. 20 and 21 show three electrodes 35-1 through 35-3, and three electrodes 36-1 through 36-3, as an example. The plurality of electrodes 35 and 36 are evenly spaced, and the interval is, for example, a minimum processing size, which results from a manufacturing step when the electrodes were processed.

One electrode 35 and one electrode 36 adjacent to each other constitute a repetition unit 37. FIG. 20 shows three repetition units 37-1 through 37-3 as an example. One repetition unit 37 has a cyclic width d. The other structures are the same as those in the first embodiment.

[1-5] Interconnect Configuration of Diffraction Grating 51

Next, the interconnect configuration of the diffraction grating 51 will be described. FIG. 22 is a schematic diagram of an interconnection configuration of the diffraction grating 51.

The plurality of electrodes 35 included in the plurality of repetition units 37 are connected to an interconnect 41 in common. The plurality of electrodes 36 included in the plurality of repetition units 37 are connected in common to an interconnect 42. The interconnect 41 and 42 are also connected to the driving circuit 20. In other words, the same voltage is applied to the plurality of electrodes 35 included in the plurality of repetition units 37, and the same voltage is applied to the plurality of electrodes 36 included in the plurality of repetition units 37.

Although not shown, the driving circuit 20 is also electrically connected to the common electrode 39 of the diffraction grating 51. The driving circuit 20 applies a common voltage (for example, 0 V) to the common electrode 39.

[2] Operation

Next, the operation of the lighting apparatus 10 configured as explained above will be described.

As shown in FIG. 17, the laser light source 11 emits laser light having a desired wavelength in accordance with the control of the control circuit 22. The laser light from the laser light 11 transmits through the collimator 12, and the collimator 12 shapes the laser light into a parallel light beam.

The laser light transmitted through the collimator 12 is incident vertically (at the incident angle=0) on the diffraction grating 51. In accordance with the control of the control circuit 22, the diffraction grating 51 deflects the laser light. The laser light diffracted by the diffraction grating 51 is incident on at least one of the phosphors 14-1 through 14-3 included in the phosphor unit 14. The phosphor unit 14 emits illumination light (visible light) of a desired color.

The illumination light emitted from the phosphor unit 14 is reflected by the plane mirror 15. The illumination light reflected by the plane mirror 15 is reflected by the concave mirror 16, and emitted as a light beam substantially parallel to the optical axis of the laser light source 11. The laser light reflected by the concave mirror 16 is transmitted through the transmissive filter 17 and then externally emitted.

Next, the deflection operation of the diffraction grating 51 will be described in more detail. The laser light incident on the diffraction grating 51 is converted to diffracted light of different orders by the use of a pattern of refractivity formed at equal intervals within the diffraction grating 51, and a plurality diffraction spots are thereby generated.

FIG. 18, described above, shows the diffraction operation of the diffraction grating 51 using 0th-order diffracted light. The driving circuit 20 applies a voltage $V2=0V$ to all the electrodes 35 included in the diffraction grating 51, all the electrodes 36 and all the common electrode 39. In this case, an electric field is not applied to the entire area of the liquid crystal layer 33, and the refractivity becomes the same in the entire area of the liquid crystal layer 33. Thus, no interference upon laser light is caused, and the diffraction grating 51 emits 0th-order diffracted light.

The phosphor 14-1 is arranged at an area on which 0th-order diffracted light of the diffraction grating 51 (0th-order spot) is incident. The phosphor 14-1 converts the wavelength of the 0th-order diffracted light, and emits illumination light at a color temperature of around 3,000 K.

FIG. 23 is a cross-sectional view illustrating a diffraction operation of the diffraction grating 51 using ±first-order diffracted light. The driving circuit 20 applies a voltage V1 (>V2) to all the electrodes 35 included in the diffraction grating 51, and applies a voltage V2=0 V to all the electrodes 36 and all the common electrodes 39. The polarities of the voltages V1 and V2 are reversed every predetermined time, in other words, alternate-current driving is performed.

As a result, an electric field is applied to the liquid crystal layer in the area occupied by the electrodes 35, and the refractivity of the liquid crystal layer becomes lower. In contrast, in the area occupied by the electrodes 36, no electric field is applied to the liquid crystal layer, and the refractivity of the liquid crystal layer remains high. The voltages V2 and V1 are set so that the phase difference between the voltage applied area and the voltage not-applied area becomes $\lambda/2$. In this case, the light intensity in the 0th-order spot is decreased by cancellation of the wavefronts. Interference between the negative first order diffracted light and positive first order diffracted light becomes stronger, and the light intensity of the negative first order diffracted light and positive first order diffracted light becomes stronger. In this case, the diffraction grating 51 emits ±first order diffraction light.

The phosphor 14-1 is arranged at an area on which positive first order diffracted light of the diffraction grating 51 (positive first order spot) is incident. The phosphor 14-3 is arranged at an area on which negative first order diffracted light of the diffraction grating 51 (negative first order spot) is incident. The phosphor 14-2 converts the wavelength of the positive first order diffracted light, and emits illumination light at a color temperature of around 10,000 K. The phosphor 14-3 converts the wavelength of the negative first order diffracted light, and emits illumination light at a color temperature of around 10,000 K.

Figure 24:
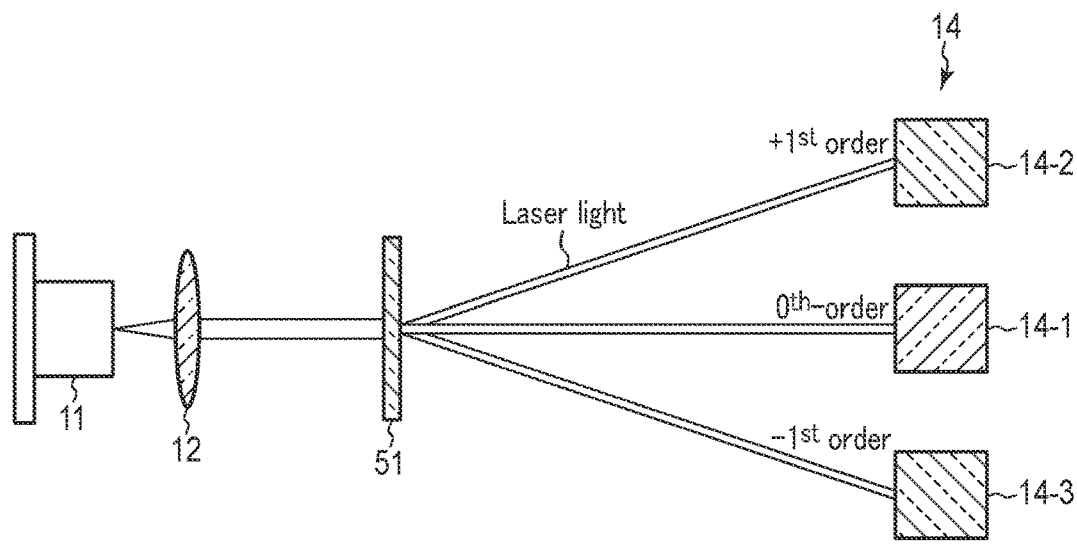
FIG. 24 is a cross-sectional view illustrating a diffraction operation of a diffraction grating using 0th-order diffracted light and ±first-order diffracted light.

FIG. 24 is a cross-sectional view illustrating a diffraction operation of the diffraction grating 51 using 0th-order diffracted light and ±first-order diffracted light. The driving circuit 20 applies a voltage V3 to all the electrodes 35 included in the diffraction grating 51, and applies a voltage V2=0 V to all the electrodes 36 and all the common electrodes 39. The voltage V3 has the relationship of "V1>V3>V2". The polarities of the voltages V3 and V2 are reversed every predetermined time, in other words, alternate-current driving is performed.

In this case, the phase difference between the voltage applied area and the voltage not-applied area becomes smaller than $\lambda/2$. Thus, the diffraction grating 51 emits three types of diffracted light, namely 0th-order diffracted light and ±first order diffracted light. The phosphor 14-1 emits red illumination light and phosphors 14-2 and 14-3 emit green illumination light. Thus, the lighting apparatus 10 emits a mixture of red and green illumination light.

Through changing the level of voltage V3, it is possible to change intensity of 0th-order diffracted light and intensity of ±first order diffracted light. It is thus possible to change the color of illumination light.

Suppose the angle of incidence a at which the laser light is incident on the diffraction grating 51, the diffraction angle β of the ±first order diffracted light, the order m of the diffracted light, the wavelength λ of the laser light, and the cyclic width d of the phase distribution constituted by the electrodes 35 and the electrodes 36. The diffraction angle β is expressed as the following expression (3):

$$d(\sin \alpha - \sin \beta) = m \cdot \lambda \qquad (3)$$

In the present embodiment, suppose the width of each of the electrodes 35 and 36 is 7 μm, a gap between the electrodes is 3 μm, the cyclic width d of the phase distribution formed by the electrodes 35 and 36 is 200 μm. Suppose the liquid crystal molecules of the liquid crystal panels are in a homogenous alignment, and the axis of deflection of an excitation laser is incident in parallel to the director of the liquid crystal molecules. Suppose the refractivity anisotropy in wavelength λ=450 nm is Δn=0.25, and the gap of each liquid crystal panel is 1 μm.

At this time, when laser light is incident on the diffraction grating at a perpendicular angle, the emission angle of the 0th-order diffracted light is 0 degrees, and the emission angle of the ±first order diffracted light is ±1.29 degrees. A phosphor of a low color temperature, around 3,000 K, is arranged at the portion (0th-order spot) on which the 0th-order diffracted light is irradiated, and a phosphor of a high color temperature, around 10,000 K, is arranged at the portion (±first order spot) on which the ±first order diffracted light is irradiated. The voltage applied to the electrodes 35 of the diffraction grating is thus controlled, and the ratio of intensity between the low color temperature and the high color temperature is changed, making it thereby possible to realize lighting of a color tone suitable for a given situation.

[3] Advantageous Effects of Fifth Embodiment

As described in detail above, the lighting apparatus 10 of the fifth embodiment includes the laser light source 11 emitting laser light, the diffraction grating (liquid crystal device) 51 that transmits and refracts the laser light from the laser light source 11, and the phosphor unit 14 including a plurality of phosphors having different color temperatures; the phosphor unit 14 receiving laser light from the diffraction grating device 51, converting a wavelength of the laser light, and emitting illumination light. The diffraction grating 51 controls the angle of laser light, and selects one of the plurality of phosphors based on the control of the control circuit 22. The diffraction grating 51 is capable of emitting 0th-order diffracted light and ±first order diffracted light. The diffraction grating 51 includes a first area where the electrodes 35 are provided and a second area where the electrodes 36 are provided, and changes a phase difference between the first area and the second area so as to change an intensity ratio of the 0th-order diffracted light and the ±first order diffracted light.

Thus, according to the fifth embodiment, it is possible to generate illumination light in a plurality of colors through the use of a single-wavelength laser light. This not only reduces the cost of the lighting apparatus 10 but can also realize a laser lighting apparatus capable of controlling colors.

In the fifth embodiment, the configuration of the liquid crystal device can be simplified compared to the first embodiment. The other effects are the same as those in the first embodiment.

In the fifth embodiment, illumination light is generated by using 0th-order diffracted light and ±first order diffracted light; however, diffracted light of an order higher than ±1 may be used.

The telecentric optical system 50 of the third embodiment may be applied to the fifth embodiment. In other words, the telecentric optical system 50 may be arranged between the diffraction grating 51 and the concave mirror 16. Thus, the same advantageous effects as those of the third embodiment can be achieved.

Sixth Embodiment

Figure 25:
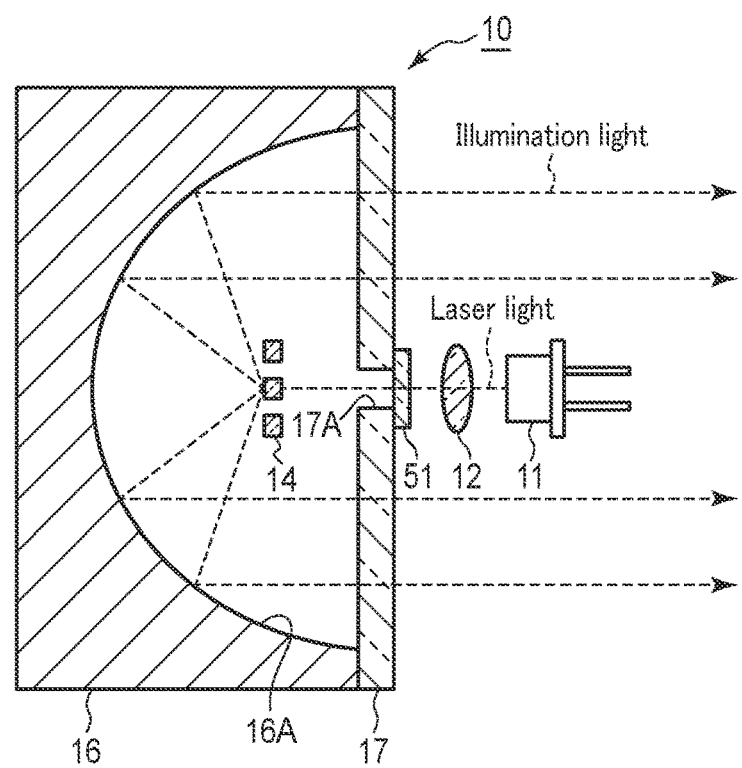
FIG. 25 is a cross-sectional view illustrating a lighting apparatus according to a sixth embodiment.

The sixth embodiment is a configuration example in which the laser light source 11 is arranged on the reflection plane side of the concave mirror 16. FIG. 25 is a cross-sectional view of the lighting apparatus 10 according to the sixth embodiment.

The arrangement of the laser light source 11, the collimator 12, the diffraction grating 51, and the phosphor unit 14 is the same as that shown in FIG. 17. The diffraction grating 51 is stationarily fixed to the transmissive filter 17, for example. The transmissive filter 17 has an opening 17A transmitting laser light emitted from the diffraction grating 51.

The concave mirror 16 is provided on a surface opposite to the laser light source 11 of the phosphor unit 14. The concave mirror 16 reflects illumination light transmitted through the phosphor unit 14. The illumination light reflected by the concave mirror 16 is transmitted through the transmissive filter 17 and then externally emitted.

The circuit configuration that controls the laser light source 11 and the diffraction grating 51 is the same as that of the fifth embodiment.

According to the sixth embodiment, the same advantageous effects as those of the fifth embodiment can be achieved. Furthermore, as the plane mirror 15 in the fifth embodiment is rendered unnecessary in the sixth embodiment, the number of components can be thereby reduced.

The telecentric optical 50 of the fourth embodiment may be applied to the sixth embodiment. In other words, the telecentric optical system 50 may be arranged between the diffraction grating 51 and the transmissive filter 17. Thus, the same advantageous effects as those of the fourth embodiment can be achieved.

In the present descriptions, being perfectly parallel is preferable where the expression "parallel" is used; however, being strictly parallel is not always necessary; being substantially parallel in light of the advantageous effects of the present invention is encompassed by the descriptions, and errors that may be caused during a manufacturing process may also be encompassed. Similarly, the expression "perpendicular" does not always mean being strictly perpendicular; being substantially perpendicular in light of the advantageous effects of the present invention is encompassed by the descriptions, and errors that may be caused during a manufacturing process may also be encompassed.

The lighting apparatus described in each of the foregoing embodiments can be adopted for various lighting devices other than headlamps of vehicles. For example, the lighting apparatus can be adopted as a lighting apparatus used in a home, an office, or a shop, and as a lighting apparatus having a color tone controlling function and a dimmer function.

However, the present invention is not limited to the foregoing embodiments, and the structural elements may be modified without departing from the scope of the present invention to realize the present invention. Furthermore, the foregoing embodiments include inventions at various stages, and various inventions can be constructed by an appropriate combination of a plurality of structural elements disclosed in one embodiment, or an appropriate combination of a plurality of structural elements disclosed in several embodiments. For example, if the object of the invention is achieved and the advantages of the invention are attained even after some of the structural elements disclosed in connection with the embodiments are deleted, an embodiment made up of the resultant structural elements can be extracted as an invention.

The invention claimed is:

1. A lighting apparatus comprising:
a laser light source emitting laser light;
a liquid crystal device that transmits the laser light from the laser light source and diffracts the laser light;
a phosphor unit that receives laser light from the liquid crystal device, converts a wavelength of the laser light to emit illumination light, the phosphor unit including a first phosphor of a first color and a second phosphor of a second color differing from the first color,
wherein the liquid crystal device controls an angle of the laser light and selects one of the first phosphor or the second phosphor.

2. The lighting apparatus according to claim 1, wherein the liquid crystal device deflects the laser light by forming a gradient of refractivity.

3. The lighting apparatus according to claim 1, wherein the liquid crystal device is a diffraction grating that emits 0th-order diffracted light and ±first order diffracted light, and
the liquid crystal device includes a first area where a first electrode is provided and a second area where a second electrode is provided, and changes an intensity ratio of the 0th-order diffracted light and the ±first order diffracted light by changing a phase difference between the first area and the second area.

4. The lighting apparatus according to claim 3, wherein the first phosphor is arranged so as to receive the 0th-order diffracted light, and
the second phosphor is arranged so as to receive the ±first order diffracted light.

5. The lighting apparatus according to claim 4, wherein the phosphor unit further comprises a third phosphor of a third color differing from the first color, and
the third phosphor is arranged so as to receive the ±first order diffracted light.

6. The lighting apparatus according to claim 1 further comprising:
a first reflection member provided on a side opposite to the liquid crystal device of the phosphor unit; and
a second reflection member that reflects, in a traveling direction of the laser light, illumination light emitted from the phosphor unit and reflected by the first reflection member.

7. The lighting apparatus according to claim 6, wherein the first reflection member is a plane mirror, and
the second reflection member is a concave mirror.

8. The lighting apparatus according to claim 1, further comprising a first reflection member that reflects illumination light emitted from the phosphor unit in a direction opposite to a traveling direction of the laser light.

9. The lighting apparatus according to claim 8, wherein the first reflection member is a concave mirror.

10. The lighting apparatus according to claim 1 further comprising a telecentric optical system provided between the liquid crystal device and the phosphor unit and refracting laser light so as to be parallel to an optical axis of the laser light source.

* * * * *